US010928783B2

(12) United States Patent
Komatsu et al.

(10) Patent No.: US 10,928,783 B2
(45) Date of Patent: Feb. 23, 2021

(54) ANALYSIS DEVICE AND ANALYSIS SYSTEM FOR RANKING PREDICTOR PERFORMANCE FOR DETERMINING ACCEPTABILITY OF AN OBJECT TO BE PRODUCED

(71) Applicant: JTEKT CORPORATION, Osaka (JP)

(72) Inventors: Hayato Komatsu, Ama-gun (JP); Koichi Kato, Nagakute (JP)

(73) Assignee: JTEKT CORPORATION, Osaka (JP)

( * ) Notice: Subject to any disclaimer, the term of this patent is extended or adjusted under 35 U.S.C. 154(b) by 515 days.

(21) Appl. No.: 15/854,265

(22) Filed: Dec. 26, 2017

(65) Prior Publication Data

US 2018/0181087 A1 Jun. 28, 2018

(30) Foreign Application Priority Data

Dec. 27, 2016 (JP) .............................. JP2016-254447

(51) Int. Cl.
*G05B 13/02* (2006.01)
*G05B 19/4063* (2006.01)

(52) U.S. Cl.
CPC ....... *G05B 13/028* (2013.01); *G05B 19/4063* (2013.01); *G05B 2219/23253* (2013.01); *Y02P 90/02* (2015.11); *Y02P 90/30* (2015.11)

(58) Field of Classification Search
CPC .............. G05B 13/028; G05B 19/4063; G05B 2219/23253; G05B 19/41875; Y02P 90/30; Y02P 90/14; G06N 5/00
See application file for complete search history.

(56) References Cited

U.S. PATENT DOCUMENTS 8,285,414 B2 * 10/2012 Aharoni ............. G05B 23/0216
700/175
8,781,982 B1 * 7/2014 Das ........................ G06N 3/049
706/21
(Continued)

FOREIGN PATENT DOCUMENTS

JP H11-96135 A 4/1999
JP 2000-215068 A 8/2000
(Continued)

OTHER PUBLICATIONS

Notice of Reason for Refusal dated Dec. 1, 2020 in corresponding Japanese Patent Application No. 2016-254447 (with English translation)(6 pages).

*Primary Examiner* — Rehana Perveen
*Assistant Examiner* — Steven W Crabb
(74) *Attorney, Agent, or Firm* — Oblon, McClelland, Maier & Neustadt, L.L.P.

(57) ABSTRACT

While a production apparatus is operating, a computation unit of an analysis device performs main predictive computation on an acceptability in real time by using one or more operating predictors selected from among a plurality of predictors. When the main predictive computation is not performed, the computation unit performs subsidiary predictive computation on the acceptability by using one or more subsidiary predictors that are not selected from among the plurality of predictors. The computation unit performs processing of interchanging the operating predictors and the subsidiary predictors based on prediction accuracies of the operating predictors and prediction accuracies of the subsidiary predictors.

2 Claims, 16 Drawing Sheets

(56) References Cited

U.S. PATENT DOCUMENTS

| | | | |
|---|---|---|---|
| 2014/0033830 A1 | 2/2014 | Kasuga et al. | |
| 2014/0114976 A1 | 4/2014 | Shiraishi | |
| 2015/0317589 A1* | 11/2015 | Anderson | G06Q 10/0631 |
| | | | 705/7.25 |
| 2017/0243122 A1 | 8/2017 | Komatsu et al. | |
| 2018/0060738 A1* | 3/2018 | Achin | G06Q 10/04 |

FOREIGN PATENT DOCUMENTS

| | | |
|---|---|---|
| JP | 2002-109208 | 4/2002 |
| JP | 2005-122438 A | 5/2005 |
| JP | 2009-282740 A | 12/2009 |
| JP | 2013-129027 | 7/2013 |
| JP | 2014-154094 | 8/2014 |
| WO | WO 2012/098805 A1 | 7/2012 |
| WO | WO 2013/001704 A1 | 1/2013 |

* cited by examiner

FIG. 3

| | | | |
|---|---|---|---|
| X-R CONTROL CHART | QUANTIFICATION METHOD IV | QUANTIFICATION METHOD I | DYNAMIC BAYESIAN NETWORK |
| PRINCIPAL COMPONENT ANALYSIS | NEURAL NETWORK | QUANTIFICATION METHOD II | HIDDEN MARKOV MODEL |
| INDEPENDENT COMPONENT ANALYSIS | SUPPORT VECTOR MACHINE | DISCRIMINANT ANALYSIS | SIMPLE MARKOV MODEL |
| CORRELATION ANALYSIS | DENSITY RATIO RECURSIVE ESTIMATION METHOD | CONJOINT ANALYSIS | MULTIPLE MARKOV MODEL |
| DISTRIBUTIVE ANALYSIS | SINGULAR SPECTRUM METHOD | k-NEAREST NEIGHBOR METHOD | PETRI NET MODEL |
| FACTOR ANALYSIS | STRUCTURAL LEARNING METHOD | LARGE MARGIN NEAREST NEIGHBOR METHOD | HYBRID PETRI NET MODEL |
| MULTIVARIATE CONTROL CHART | NAIVE BAYES METHOD | GAUSSIAN PROCESS REGRESSION | INVARIANT DISCRIMINATION METHOD |
| CUMULATIVE SUM METHOD | DECISION TREE | RIDGE REGRESSION | MULTI-LEVEL PETRI NET MODEL |
| MOMENT METHOD | MT METHOD | LASSO REGRESSION | MUTUALLY CONNECTED NEURAL NETWORK |
| HOTELLING'S $T^2$ METHOD | k-MEANS CLUSTERING METHOD | BRIDGE REGRESSION | BOLTZMANN MACHINE |
| $T^2$-Q CONTROL CHART | FUZZY k-MEANS CLUSTERING METHOD | ADAPTIVE LASSO REGRESSION | RECURRENT NEURAL NETWORK |
| SURVIVAL ANALYSIS | ENTROPY METHOD | PARTIAL LEAST SQUARES REGRESSION | RANDOM FOREST |
| TESTING | COVARIANCE STRUCTURE ANALYSIS METHOD | SPARSE PARTIAL LEAST SQUARES REGRESSION | LINEAR ADAPTIVE CONTROL |
| CLUSTER ANALYSIS | DEEP LEARNING | ELASTIC NET REGRESSION | RECURSIVE IDENTIFICATION |
| SELF-ORGANIZING MAP | MULTIPLE REGRESSION ANALYSIS | WEIGHTED DIRECTED GRAPH | GAUSSIAN MIXTURE RECURSIVE UPDATE METHOD |
| QUANTIFICATION METHOD III | TIME SERIES ANALYSIS | ARROW DIAGRAM | QUANTITATIVE ANALYSIS METHOD FOR QUALITATIVE FACTORS |
| MULTI-DIMENSIONAL SCALING METHOD | LOGISTIC ANALYSIS | BAYESIAN NETWORK | |

FIG. 4

RANKING OF HIGHER PREDICTION ACCURACY

TIME T1

| RANK | PREDICTOR TYPE | |
|---|---|---|
| No.1 | A | OPERATING PREDICTOR |
| No.2 | B | |
| No.3 | C | |
| No.4 | F | SUBSIDIARY PREDICTOR |
| No.5 | H | |
| No.6 | G | |
| No.7 | D | |
| No.8 | E | |

⇩

TIME T2   PREDICTION ACCURACY CHANGED AS $Q_C < Q_F$

⇩

TIME T3

RANKING OF HIGHER PREDICTION ACCURACY

| RANK | PREDICTOR TYPE | |
|---|---|---|
| No.1 | A | OPERATING PREDICTOR |
| No.2 | B | |
| No.3 | F | |
| No.4 | C | SUBSIDIARY PREDICTOR |
| No.5 | H | |
| No.6 | G | |
| No.7 | D | |
| No.8 | E | |

FIG. 8

PREDICTOR INFORMATION 43

| PREDICTOR TYPE | REQUIRED TIME | PREDICTION ACCURACY | COMPUTATION OPERATION COUNT |
|---|---|---|---|
| A | $T_A$ | $Q_A$ | $N_A$ |
| B | $T_B$ | $Q_B$ | $N_B$ |
| C | $T_C$ | $Q_C$ | $N_C$ |
| D | $T_D$ | $Q_D$ | $N_D$ |
| E | $T_E$ | $Q_E$ | $N_E$ |
| F | $T_F$ | $Q_F$ | $N_F$ |
| G | $T_G$ | $Q_G$ | $N_G$ |
| H | $T_H$ | $Q_H$ | $N_H$ |

*FIG. 10*

| PREDICTION RESULT: INSPECTION RESULT | PRE-DICTOR A | PRE-DICTOR B | | PRE-DICTOR G | PRE-DICTOR H |
|---|---|---|---|---|---|
| NON-DEFECTIVE ITEM: NON-DEFECTIVE ITEM (p1) | Ap1 | Bp1 | | Gp1 | Hp1 |
| DEFECTIVE ITEM: DEFECTIVE ITEM (p2) | Ap2 | Bp2 | | Gp2 | Hp2 |
| NON-DEFECTIVE ITEM: DEFECTIVE ITEM (p3) | Ap3 | Bp3 | | Gp3 | Hp3 |
| DEFECTIVE ITEM: NON-DEFECTIVE ITEM (p4) | Ap4 | Bp4 | | Gp4 | Hp4 |
| PREDICTION ACCURACY (p1+p2−p3*2−p4) | $Q_A$ | $Q_B$ | | $Q_G$ | $Q_H$ |

FIG. 12

| | NON-DEFECTIVE ITEM PROBABILITY (X) | WEIGHTING FACTOR (Y) | PREDICTION VALUE ($X*Y/\Sigma Y$) |
|---|---|---|---|
| PREDICTOR A | Ar | Ak | Z1 $\left(\dfrac{Ar*Ak}{Ak+Bk+Ck}\right)$ |
| PREDICTOR B | Br | Bk | Z2 $\left(\dfrac{Br*Bk}{Ak+Bk+Ck}\right)$ |
| PREDICTOR C | Cr | Ck | Z3 $\left(\dfrac{Cr*Ck}{Ak+Bk+Ck}\right)$ |
| | | | Z (Z1+Z2+Z3) ← RESULT OF COMPREHENSIVE MAIN PREDICTIVE COMPUTATION |

ANALYSIS DEVICE AND ANALYSIS SYSTEM FOR RANKING PREDICTOR PERFORMANCE FOR DETERMINING ACCEPTABILITY OF AN OBJECT TO BE PRODUCED

INCORPORATION BY REFERENCE

The disclosure of Japanese Patent Application No. 2016-254447 filed on Dec. 27, 2016 including the specification, drawings and abstract, is incorporated herein by reference in its entirety.

BACKGROUND OF THE INVENTION

1. Field of the Invention

The present invention relates to an analysis device and an analysis system.

2. Description of the Related Art

It is known that determination is made on the acceptability of the condition of an object to be produced based on various types of data on a production apparatus such as a machine tool or an industrial robot. It is also known that determination is made on failure, life expectancy, maintenance timings, and the like of the production apparatus based on the various types of data.

Japanese Patent Application Publication No. 2013-129027 (JP 2013-129027 A) describes a method for monitoring a grinding burn of a workpiece. During grinding of a workpiece, a grinding load of a grinding wheel and a rotational speed of the workpiece are detected, and the detected grinding load is compared with a threshold of the grinding load based on the rotational speed, thereby determining whether a grinding burn occurs. The threshold is set based on a grinding load of the grinding wheel relative to a rotational speed of the workpiece when the grinding burn of the workpiece occurs.

International Publication No. 2012/098805 (WO 2012/098805) describes that trial grinding is performed and a threshold is set based on a grinding load of the trial grinding. Then, a grinding load detected during actual grinding is compared with the threshold, thereby determining whether a grinding abnormality occurs.

Japanese Patent Application Publication No. 2014-154094 (JP 2014-154094 A) describes that abnormalities of the quality of objects to be produced are predicted based on the following quality tendency pattern. For example, in a case of grinding the outer peripheral surfaces of workpieces with a grinding wheel, the dimensional accuracy tends to deteriorate as the number of workpieces increases. Based on a relationship between a grinding time and a grinding resistance of one workpiece, a relationship between the number of workpieces and an average of grinding resistances is obtained. Considering the relationship between the number of workpieces and the dimensional accuracy, a threshold can be set for the average of grinding resistances in a quality tendency pattern indicating the relationship between the number of workpieces and the average of grinding resistances. That is, by grasping the grinding resistances and the number of workpieces, abnormalities of objects to be produced can be predicted based on the quality tendency pattern and the threshold described above.

In recent years, use of big data has been growing. It is expected that analysis is performed by using big data to determine the acceptability of the condition of an object to be produced and the acceptability of the condition of a production apparatus.

For example, Japanese Patent Application Publication No. 2002-109208 (JP 2002-109208 A) describes an analysis model determining device configured to determine an optimum analysis model from among three analysis models, thereby improving the accuracy of analysis. In JP 2002-109208 A, the three analysis models are caused to learn by applying learning data to the analysis models, and then probabilities of default are measured by applying evaluation data to the analysis models. An optimum analysis model is determined based on results of the measurement.

International Publication No. 2013/001704 (WO 2013/001704) describes that results of analysis performed by different types of analysis method are obtained and desired evaluation is made in consideration of the plurality of analysis results.

Nowadays, a large number of analysis methods are known. It is conceivable that the acceptability of the condition of a production apparatus and the acceptability of the condition of an object to be produced may be predicted by using a plurality of types of analysis method. Since a large number of analysis methods are present, however, it is not easy to grasp which analysis method may be used for increasing the accuracy of acceptability prediction. That is, the selection of an analysis method is not easy despite its importance.

Each analysis method generally has its suitable environment. Therefore, suitable analysis methods vary depending on the environment. Further, suitable analysis methods vary depending on the amount of analysis data. For example, an analysis method suitable for a case where the amount of analysis data is small in an initial stage of analysis is different from an analysis method suitable for a case where the amount of analysis data is large because analysis continues over a long time. It is therefore desirable that the analysis method to be applied be changed as appropriate depending on a situation.

As the analysis operation count increases, the prediction accuracy of the analysis method changes, and the reliability of the prediction accuracy increases. That is, the increase in the analysis operation count leads to the improvement in the accuracy of acceptability prediction. Regarding an analysis method that is used for acceptability prediction, the analysis operation count increases because the analysis is performed repeatedly. As a result, the prediction accuracy of this analysis method is stabilized, and the reliability of the prediction accuracy is improved. Regarding an analysis method that is not used for acceptability prediction, however, the prediction accuracy of this analysis method does not change unless analysis is performed. As a result, the reliability of the prediction accuracy is not improved easily.

Particularly when the acceptability of the condition of a production apparatus and the acceptability of the condition of an object to be produced are predicted in real time, the analysis operation count of the analysis method that is in use and the analysis operation count of the analysis method that is not in use have a greater difference therebetween. It is therefore desirable that a sufficient analysis operation count can be secured to the extent possible also for the analysis method that is not in use. Then, the reliability of the prediction accuracy is improved in each of the large number of analysis methods. Thus, when the environment changes, the analysis method can be changed to an analysis method suitable for the changed environment.

In order to secure the analysis operation count of the analysis method that is not used for acceptability prediction, it is conceivable that predictive computation may constantly be performed by the analysis method that is not in use similarly to the analysis method that is in use. However, the cost increases when a dedicated processor (CPU) is provided in order to perform the predictive computation by the analysis method that is not in use. If the predictive computation is performed by the analysis method that is not in use with a processor that is performing the predictive computation by the analysis method that is used for acceptability prediction, it is likely that real-time computation cannot be performed. Alternatively, a high-performance processor is required, and the cost increases after all.

SUMMARY OF THE INVENTION

It is one object of the present invention to provide an analysis device in which the reliabilities of prediction accuracies of many analysis methods can be improved without cost increase by performing predictive computation many times by an analysis method that is not in use, and also to provide an analysis system using the analysis device.

An analysis device according to one aspect of the present invention is configured to predict an acceptability of a condition of a production apparatus or an acceptability of a condition of an object to be produced by the production apparatus.

The analysis device includes a storage unit and a computation unit. The storage unit is configured to store a plurality of predictors that are configured to predict the acceptability by using different analysis methods based on data on the production apparatus. The computation unit is configured to perform, while the production apparatus is operating, main predictive computation on the acceptability in real time by using one or more operating predictors selected from among the plurality of predictors.

The computation unit is configured to perform, when the main predictive computation is not performed, subsidiary predictive computation on the acceptability by using one or more subsidiary predictors that are not selected from among the plurality of predictors. Further, the computation unit is configured to perform processing of interchanging the operating predictors and the subsidiary predictors based on prediction accuracies of the operating predictors and prediction accuracies of the subsidiary predictors.

That is, the computation unit that causes the operating predictors to perform the main predictive computation also causes the subsidiary predictors to perform the subsidiary predictive computation. Thus, the subsidiary predictors can be evaluated with no need for a new dedicated apparatus. As a result, the reliabilities of the prediction accuracies of the subsidiary predictors are improved. Thus, even if the environment changes, the analysis method can be changed to an analysis method suitable for the changed environment.

The computation unit causes the subsidiary predictors to perform the subsidiary predictive computation when the operating predictors do not perform the main predictive computation. Therefore, the subsidiary predictive computation does not influence the main predictive computation performed by the operating predictors. That is, the main predictive computation can be performed in real time while performing the subsidiary predictive computation.

An analysis system according to another aspect of the present invention includes a first analysis device and a second analysis device. The first analysis device is the analysis device described above. The second analysis device is connected to the first analysis device via a network so that data is communicable between the first analysis device and the second analysis device.

The second analysis device includes a second storage unit and a second computation unit. The second storage unit is configured to acquire and store the data on the production apparatus from the first analysis device, and to store the plurality of predictors. The second computation unit is configured to perform processing independently of the computation unit of the first analysis device, and to perform second subsidiary predictive computation on the acceptability by using the subsidiary predictors stored in the second storage unit.

The subsidiary predictive computation performed by the first analysis device by using the subsidiary predictors may be insufficient. Therefore, the second analysis device is subsidiarily used for causing the subsidiary predictors to perform the second subsidiary predictive computation. In this manner, the first analysis device and the second analysis device are used in combination for causing the subsidiary predictors to perform the predictive computation, whereby the reliabilities of the prediction accuracies of the subsidiary predictors can be improved even earlier. The second analysis device performs processing while sharing the load with the first analysis device, whereby the cost can be reduced as compared with a case where a dedicated external device is provided.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a diagram illustrating types of predictor of the analysis device;

FIG. 4 is an explanatory diagram of processing of interchanging operating predictors and subsidiary predictors in the analysis device;

FIG. 8 is a diagram illustrating predictor information stored in a predictor information storage unit;

FIG. 10 is a diagram illustrating an example of a method for calculating prediction accuracies;

FIG. 12 is a diagram illustrating an example of a method for comprehensive main predictive computation;

DETAILED DESCRIPTION OF EMBODIMENTS

A first embodiment is described.

A production apparatus 1 is an apparatus configured to produce a predetermined object W to be produced. The production apparatus 1 includes a machine tool, a conveyance device, an industrial robot, or other various apparatuses. The production apparatus 1 is, for example, a machine tool assigned to a processing step of a production line, as typified by a grinding machine configured to grind crankshafts and the like, or a conveyor configured to convey objects into or out of a machine tool.

Figure 1:
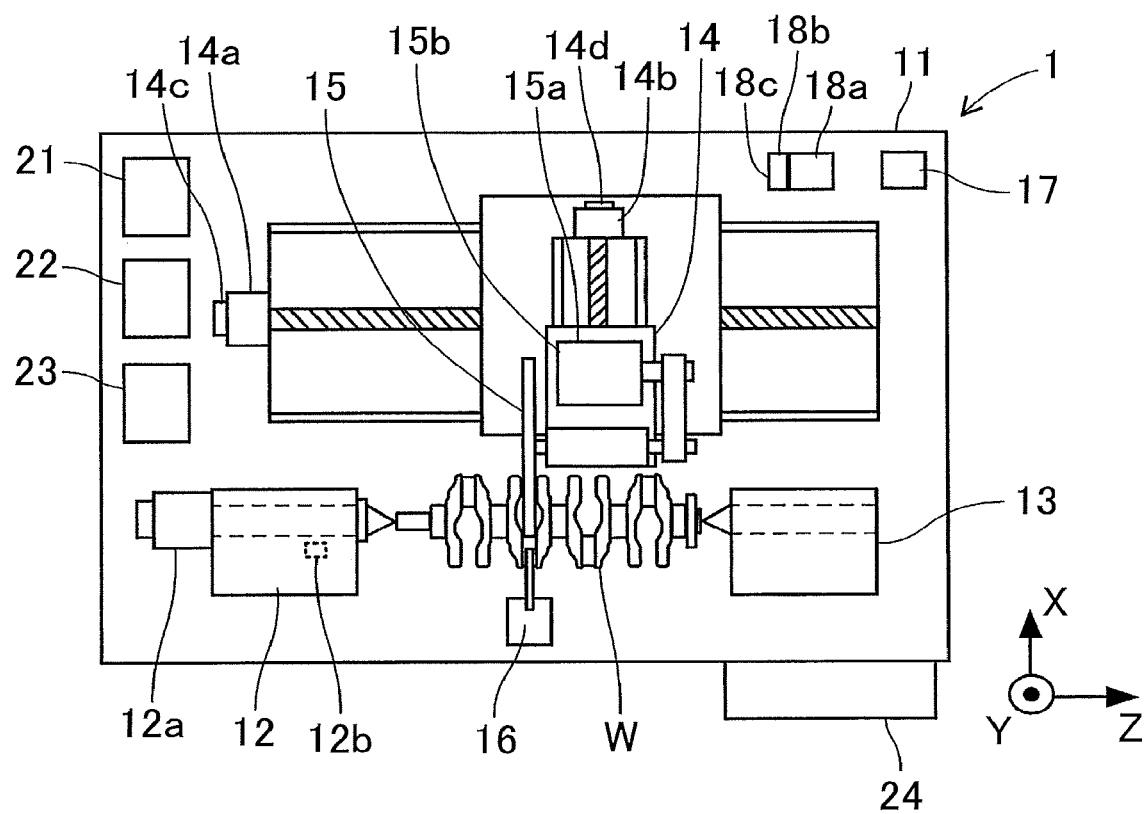
FIG. 1 is a diagram illustrating the configuration of a grinding machine that is an example of a production apparatus according to a first embodiment.

An example of the configuration of the production apparatus 1 is described below with reference to FIG. 1 and FIG. 2. In this embodiment, the production apparatus 1 is, for example, a grinding machine. Description is given taking a wheel spindle stock traverse type grinding machine as an example of the grinding machine. The wheel spindle stock traverse type grinding machine causes a wheel spindle stock 14 to traverse (move in a Z-axis direction) relative to a bed 11. Alternatively, a table traverse type grinding machine is also applicable to the grinding machine. The table traverse type grinding machine causes a headstock 12 to traverse (move in the Z-axis direction) relative to the bed 11. The object W (workpiece) to be produced by the grinding machine is, for example, a crankshaft. The grinding machine grinds crank journals, crank pins, or the like of the crankshaft.

The grinding machine is constructed as follows. The bed 11 is fixed to an installation surface, and the headstock 12 and a tailstock 13 are mounted on the bed 11. The headstock 12 and the tailstock 13 rotatably support both ends of the crankshaft. The crankshaft is supported by the headstock 12 and the tailstock 13 so as to rotate about the crank journals. The headstock 12 includes a motor 12a configured to drive the crankshaft to rotate. A detector (vibration sensor) 12b is attached to the headstock 12. The detector 12b detects vibration of a main spindle.

The wheel spindle stock 14 is provided on the bed 11. The wheel spindle stock 14 is movable in the Z-axis direction (direction of an axis of the crankshaft) and in an X-axis direction (direction orthogonal to the axis of the crankshaft). The wheel spindle stock 14 moves in the Z-axis direction by a motor 14a and in the X-axis direction by a motor 14b. The wheel spindle stock 14 is provided with a detector 14c configured to detect the position of the wheel spindle stock 14 in the Z-axis direction, and a detector 14d configured to detect the position of the wheel spindle stock 14 in the X-axis direction. Each of the detectors 14c and 14d is, for example, a rotary encoder configured to measure rotation of the motor 14b or the like, and may also be a linear position transducer such as a linear scale.

The wheel spindle stock 14 is provided with a grinding wheel 15 in a rotatable manner. The grinding wheel 15 grinds the crank pins or the crank journals. The grinding wheel 15 is driven to rotate by a motor 15a. Further, the wheel spindle stock 14 is provided with a detector 15b configured to detect power of the motor 15a or the like. The detector 15b is, for example, an ammeter, and may also be, for example, a wattmeter configured to measure electric power of the motor 15a, or a voltmeter configured to measure voltage of the motor 15a. The electric current, power, voltage, or the like of the motor 15a for the grinding wheel 15 can be used to indirectly obtain a grinding resistance. Alternatively, the detector 15b may be a load detector provided on the headstock 12 or the wheel spindle stock 14 to directly obtain the grinding resistance.

The bed 11 is provided with a sizing device 16 configured to measure the outside diameter of the crank pin or the crank journal that is a portion to be ground in the crankshaft. Further, the bed 11 is provided with a detector 17 configured to detect an environmental temperature (ambient temperature). Still further, the bed 11 is provided with a pump 18a configured to supply a coolant to the portion to be ground, a valve 18b configured to switch ON/OFF of coolant supply, and a detector 18c configured to detect the condition of the valve 18b. The detector 18c is a flow meter for the coolant, and may also be, for example, a pressure sensor configured to detect the pressure of the coolant.

The grinding machine includes a computerized numerical control (CNC) device 21, a programmable logic controller (PLC) 22, an analysis device 23, and an operator's panel 24. As illustrated in FIG. 2, the CNC device 21 controls the motors 12a and 15a that cause the headstock 12 and the grinding wheel 15 to rotate, and also controls the motors 14a and 14b that cause the grinding wheel 15 to move relative to the crankshaft. At the time of control, the CNC device 21 acquires detection data from each of the detector (vibration sensor) 12b configured to detect vibration of the main spindle, the detectors 14c and 14d for the positions of the wheel spindle stock 14, and the detector 15b for the power of the motor 15a.

The PLC 22 acquires detection data from the sizing device 16. The PLC 22 controls the pump 18a and the valve 18b to control the coolant supply. At the time of control, the PLC 22 acquires detection data from the detector 18c configured to detect the condition of the valve 18b. Further, the PLC 22 acquires detection data from the detector 17 configured to detect the environmental temperature.

Sampling periods of the detectors 12b, 14c, 14d, 15b, 16, 17, and 18c are not all the same but different at least in part. For example, the sampling period of the detector 15b for the power of the motor 15a is several milliseconds, the sampling period of the sizing device 16 is several milliseconds, the sampling period of the detector 18c for the valve condition is several tens of milliseconds, and the sampling period of the detector 17 for the temperature is several tens of milliseconds. The respective sampling periods are adjusted as appropriate depending on the control method.

The analysis device 23 predicts the acceptability of the condition of the production apparatus 1 or the acceptability of the condition of the object W to be produced by the production apparatus 1. For example, the analysis device 23 predicts that the object W to be produced is a defective item due to a grinding burn that occurs in the object W to be produced. Further, the analysis device 23 predicts failure, life expectancy, maintenance timings, and the like of each component that constitutes the production apparatus 1. In this embodiment, the analysis device 23 analyzes whether the crankshaft that is the object W to be produced is a non-defective item in the process of grinding the crank journals, the crank pins, or the like of the crankshaft.

Figure 2:
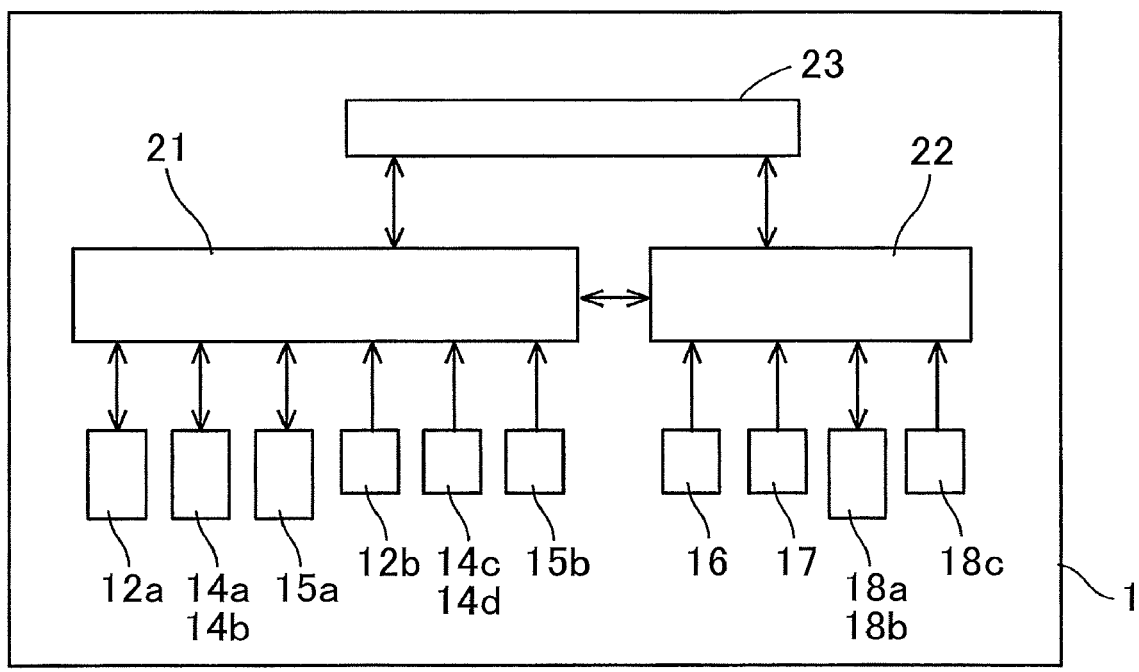
FIG. 2 is a diagram illustrating how an analysis device provided in the grinding machine is connected to other components.

As illustrated in FIG. 2, the analysis device 23 acquires detection data from each of the detectors 12b, 14c, 14d, 15b, 16, 17, and 18c (corresponding to data on the production apparatus 1) via the CNC device 21 and the PLC 22. The analysis device 23 predicts the acceptability based on the detection data.

The analysis device 23 is described as a device that is provided separately from the CNC device 21 and the PLC 22, but may be an embedded system in the CNC device 21, the PLC 22, or the like, or may also be a personal computer, a server, or the like.

The types of predictor of the analysis device 23 are described.

As described above, the analysis device 23 predicts the acceptability of the condition of the production apparatus 1 or the acceptability of the condition of the object W to be produced by the production apparatus 1. As illustrated in FIG. 3, a wide variety of predictors (analysis engines) are applicable to predictive computation on the acceptability.

Based on the characteristics of the predictors illustrated in FIG. 3, the predictors are classified into a quality control (QC) method (for example, an X-R control chart and correlation analysis), linear adaptation (for example, linear adaptive control), non-linear identification (for example, recursive identification), a Bayes method (for example, a naive Bayes method and a Bayesian network), machine learning (for example, a neural network and a support vector machine), and regression analysis (for example, multiple regression analysis and ridge regression).

The prediction accuracy of each predictor changes depending on the amount of data to be analyzed (number of pieces of data to be analyzed) and a model (set parameter). That is, in a predictor having many variables and constants in a statistical model itself or the like or a predictor having many prior probability distributions, the accuracy of the model increases as the amount of data to be analyzed increases. Therefore, the prediction accuracy is improved.

For example, the QC method is small in the calculation amount, and the correlation is easy to understand. Therefore, the prediction accuracy can be improved even if the amount of data to be analyzed is small. In the QC method, however, there is low expectancy of the improvement in the prediction accuracy even if the amount of data to be analyzed increases. In the Bayes method, when the amount of data to be analyzed increases, prediction based on prior information (such as a prior probability) is shifted toward prediction based on data, and therefore the prediction accuracy is improved. In the machine learning, the prediction accuracy continues to be improved when the amount of data to be analyzed increases. In the regression analysis, the prediction accuracy is similarly improved when the amount of data to be analyzed increases.

In the linear adaptation, the accuracy of the model itself is a factor in the improvement in the prediction accuracy. As compared with the QC method, the prediction accuracy is easily improved in the linear adaptation even in a stage in which the amount of data is small. In the non-linear identification, the accuracy of the model itself is a factor in the improvement in the prediction accuracy, but the model itself is difficult to construct.

From the points described above, when the amount of data to be analyzed is relatively small and the amount of data acquired from each detector is small, the prediction accuracy can be improved earlier by using the QC method or the linear adaptation. When the amount of data to be analyzed is relatively large, the prediction accuracy can be improved securely by using the regression analysis or the machine learning. Therefore, it is appropriate that different types of predictor be used in combination from among the QC method, the Bayes method, the linear adaptation, the regression analysis, and the machine learning. That is, it is appropriate that the predictors in which the prediction accuracy increases when the amount of data to be analyzed is small and the predictors in which the prediction accuracy increases when the amount of data to be analyzed is large be used in combination. Thus, the prediction accuracy can be maintained at a high level irrespective of whether the amount of data to be analyzed is small or large, that is, irrespective of the change in the amount of data.

In the machine learning, the regression analysis, and the like, a plurality of types of predictor that are different in variables, constants, accuracy of the model itself, and the like may be used. In the machine learning, the regression analysis, and the like, when the amount of data to be analyzed increases, the prediction accuracy can be improved by using an optimum predictor in terms of variables, constants, and accuracy of the model itself.

An overview of processing to be performed by the analysis device 23 is described with reference to FIG. 3 to FIG. 6. The analysis device 23 performs prediction on the acceptability of the condition of the production apparatus 1 or the acceptability of the condition of the object W to be produced by the production apparatus 1 (hereinafter referred to simply as "acceptability prediction") by using predictors selected from among the predictors illustrated in FIG. 3.

The analysis device 23 may have all or some of the predictors illustrated in FIG. 3. The analysis device 23 has a plurality of predictors. At the time of acceptability prediction, the analysis device 23 uses a plurality of selected predictors instead of using all the predictors of the analysis device 23. That is, the predictors of the analysis device 23 are classified into a plurality of predictors that are used for actual acceptability prediction (hereinafter referred to as "operating predictors") and one or more predictors that are not selected (hereinafter referred to as "subsidiary predictors"). The analysis device 23 interchanges the operating predictors and the subsidiary predictors depending on a situation.

As illustrated in FIG. 4, at a time T1, the prediction accuracies of predictors A to H are ranked in the order of A, B, C, F, H, G, D, and E from the higher side. The analysis device 23 sets three predictors A, B, and C having higher prediction accuracies as operating predictors. The remaining predictors F, H, G, D, and E having lower prediction accuracies are subsidiary predictors. That is, the analysis device 23 performs actual acceptability prediction by using the operating predictors A, B, and C.

At a time T2, a prediction accuracy $Q_F$ of the predictor F is higher than a prediction accuracy $Q_C$ of the predictor C. Then, the predictors C and F are interchanged in the ranking of higher prediction accuracy. Therefore, at a time T3, the predictor F is set as an operating predictor, and the predictor C is set as a subsidiary predictor. That is, the analysis device 23 performs actual acceptability prediction by using three operating predictors A, B, and F. The subsidiary predictors C, H, G, D, and E are not used for actual acceptability prediction.

Until the time T1, the operating predictors A, B, and C perform predictive computation many times, and therefore the prediction accuracies of the operating predictors A, B, and C are improved. The prediction accuracies of the subsidiary predictors D, E, F, G, and H are not improved unless predictive computation is performed. Therefore, the subsidiary predictors D, E, F, G, and H also perform predictive computation as many times as possible. Thus, the prediction accuracies can be changed, and the reliabilities of the prediction accuracies are improved. The predictive computation to be performed by the operating predictor is hereinafter referred to as main predictive computation, and the predictive computation to be performed by the subsidiary predictor is hereinafter referred to as subsidiary predictive computation.

Figure 5:
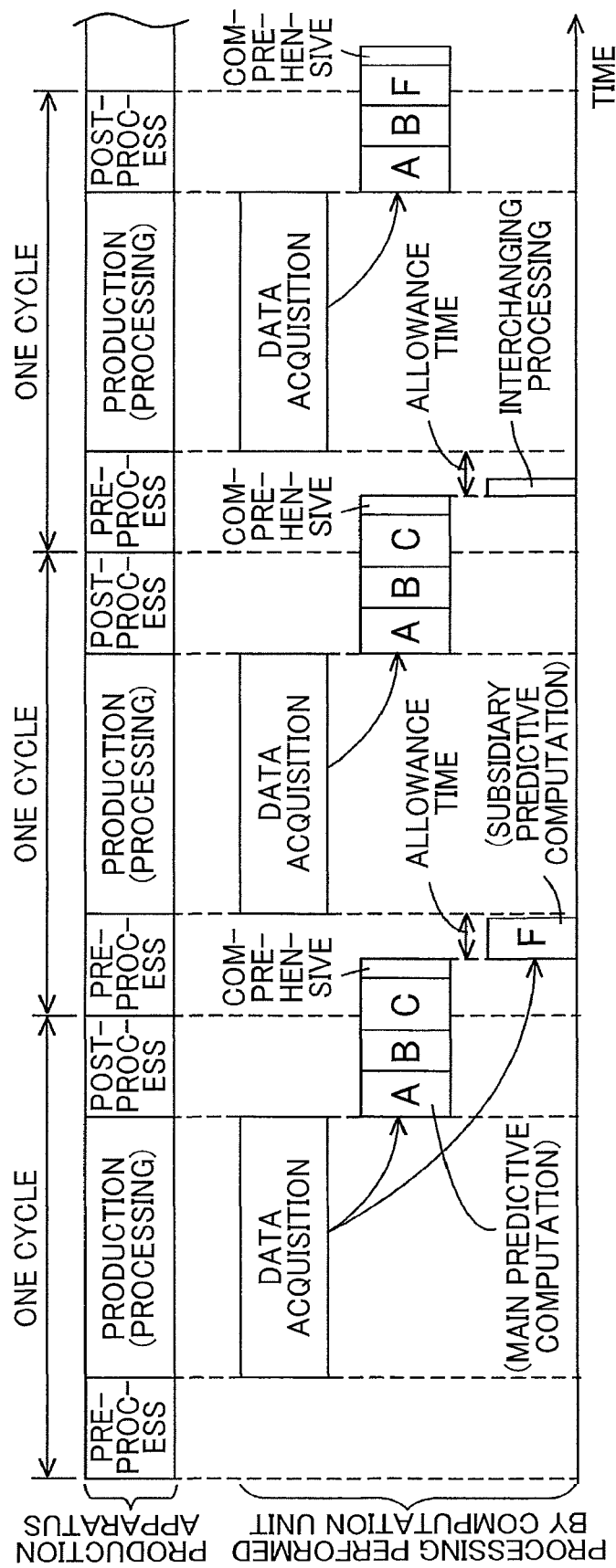
FIG. 5 is a timing chart illustrating processing to be performed by a computation unit of the analysis device while the production apparatus is operating.

As a first mode, as illustrated in FIG. 5, it is assumed that the production apparatus 1 sequentially and continuously produces a plurality of objects W to be produced. The production apparatus 1 performs, in one cycle, a pre-process such as conveyance of an object W to be produced into the production apparatus 1, a production process (processing), and a post-process such as conveyance of the object W to be produced out of the production apparatus 1 and measurement.

During the production process for a first object W to be produced, the analysis device 23 acquires detection data from each of the detectors 12b, 14c, 14d, 15b, 16, 17, and 18c (data on the production apparatus 1). During the post-process for the first object W to be produced and the pre-process for a second object W to be produced that is subsequent to the first object to be produced, the analysis device 23 performs individual main predictive computation using the operating predictors A, B, and C in real time based on the acquired detection data. Then, the analysis device 23 performs comprehensive main predictive computation in real time based on results of the individual main predictive computation performed by the operating predictors A, B, and C (described later). The result of the comprehensive main predictive computation is a final result of acceptability.

An allowance time (continuous time in which the main predictive computation is not performed) is present after the individual main predictive computation and the comprehensive main predictive computation are performed and until the production process for the second object W to be produced is started. Therefore, the subsidiary predictors D, E, F, G, and H perform the subsidiary predictive computation by using the allowance time. A subsidiary predictor that performs the subsidiary predictive computation is selected based on the length of the allowance time, the latest prediction accuracy, the prediction operation count, and the like. In FIG. 5, the subsidiary predictor F performs the subsidiary predictive computation during the allowance time.

Figure 6:
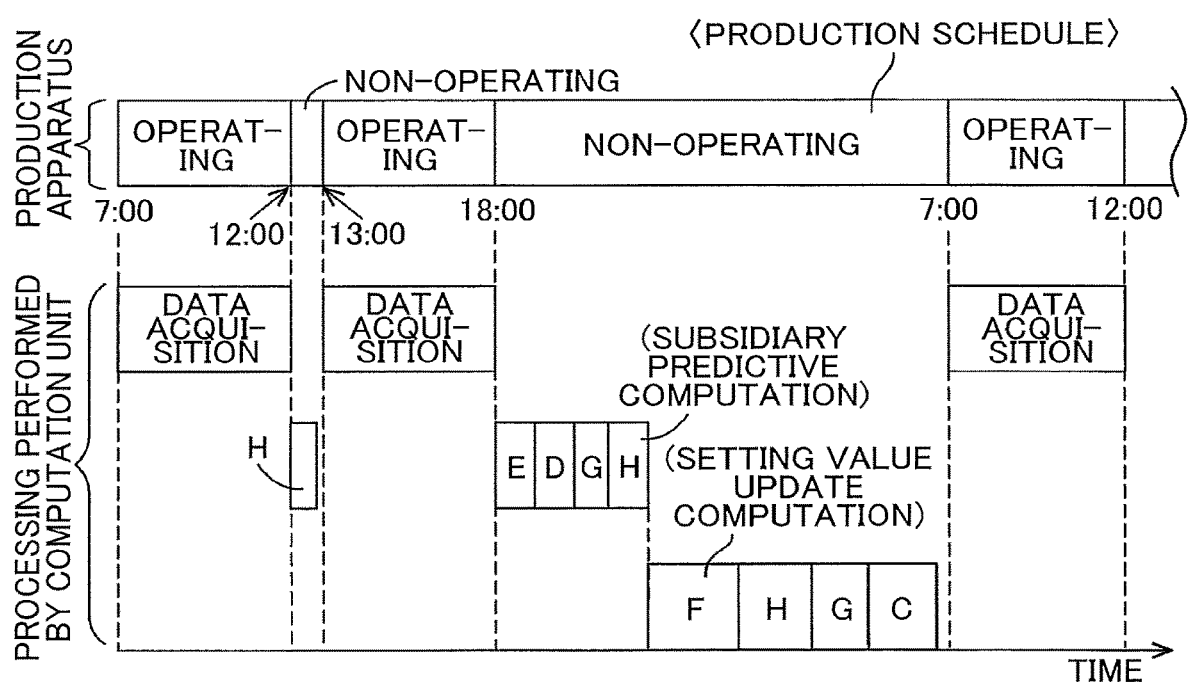
FIG. 6 is a timing chart illustrating processing to be performed by the computation unit in a production schedule (operating or non-operating) of the production apparatus.

As a second mode, as illustrated in FIG. 6, the production apparatus 1 has an operating time and a relatively long non-operating time (continuous time in which the main predictive computation is not performed) based on its production schedule. For example, the relatively long non-operating time is lunchtime, shut-down at night, or maintenance of the production apparatus 1. The term "relatively long" means that the time is longer than the allowance time in one cycle. FIG. 6 illustrates a daily production schedule, and also illustrates lunchtime and shut-down at night as the long non-operating times.

In the operating time of the production apparatus 1, the analysis device 23 acquires detection data from each of the detectors 12b, 14c, 14d, 15b, 16, 17, and 18c (data on the production apparatus 1) during the production process illustrated in FIG. 5. In the long non-operating time, the analysis device 23 causes the subsidiary predictors D, E, F, G, and H to perform the subsidiary predictive computation by using the acquired detection data.

In the long non-operating time of the production apparatus 1, the analysis device 23 may perform processing of updating setting values such as parameters (parameters of an analysis model) for each of the subsidiary predictors D, E, F, G, and H. As described above, the prediction accuracy of the predictor is generally improved as the amount of data to be analyzed is larger. Therefore, the processing of updating setting values such as parameters is performed for each of the subsidiary predictors D, E, F, G, and H by using existing detection data and newly acquired detection data. In FIG. 6, the processing of updating setting values is performed for each of the subsidiary predictors F, H, G, and C.

Figure 7:
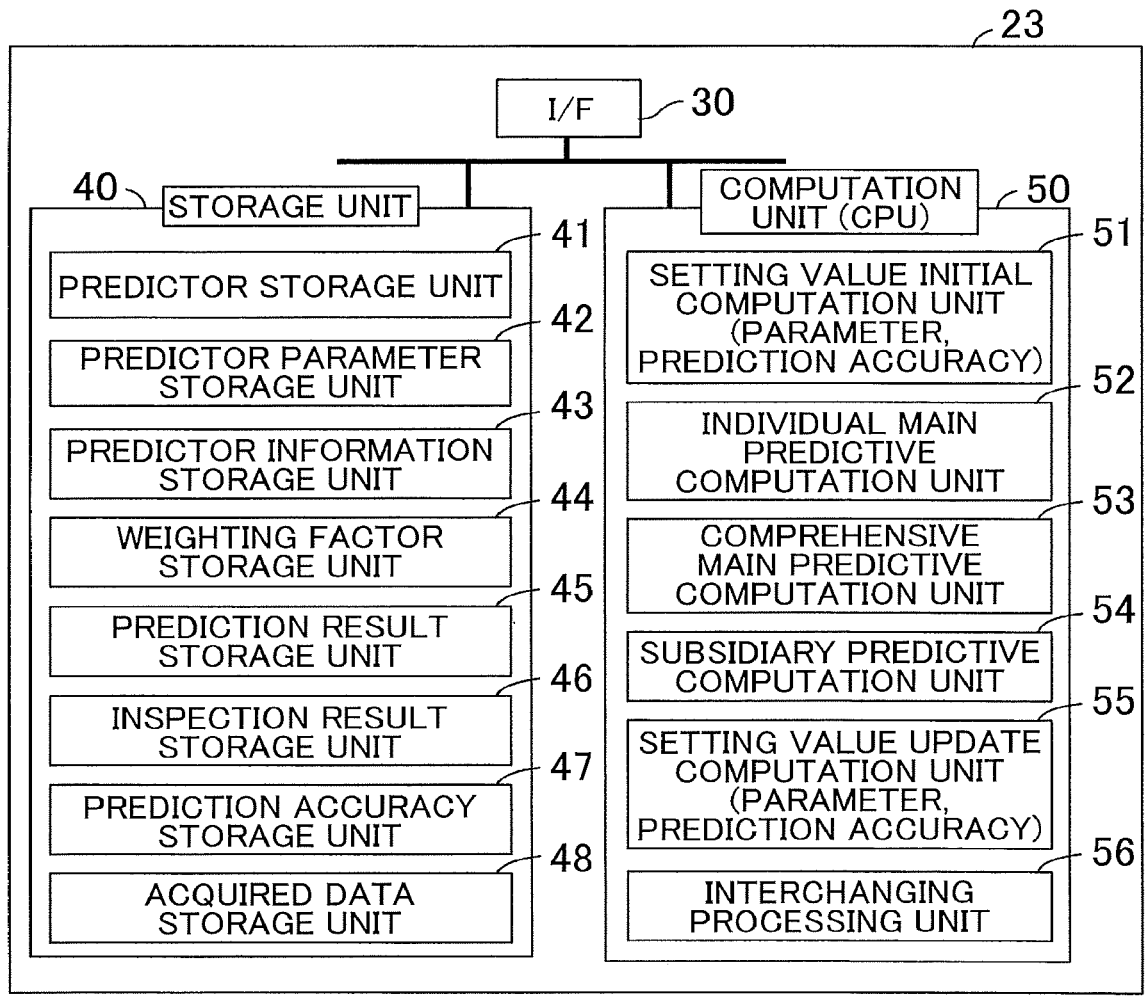
FIG. 7 is a block diagram illustrating the configuration of the analysis device.

The detailed configuration of the analysis device 23 is described with reference to FIG. 7 to FIG. 16. As illustrated in FIG. 7, the analysis device 23 includes an interface 30, a storage unit 40, and a computation unit 50. The interface 30 is connected to the CNC device 21 and the PLC 22. The storage unit 40 includes a predictor storage unit 41, a predictor parameter storage unit 42, a predictor information storage unit 43, a weighting factor storage unit 44, a prediction result storage unit 45, an inspection result storage unit 46, a prediction accuracy storage unit 47, and an acquired data storage unit 48.

The predictor storage unit 41 stores the plurality of predictors A to H. Each of the predictors A to H applies an analysis method selected from among various analysis methods illustrated in FIG. 3. That is, the predictor storage unit 41 stores the predictors A to H configured to predict the acceptability by using different analysis methods based on detection data from each of the detectors 12b, 14c, 14d, 15b, 16, 17, and 18c (data on the production apparatus 1). The number of predictors to be stored in the predictor storage unit 41 may be changed as appropriate. The predictor parameter storage unit 42 stores parameters corresponding to the predictors A to H, respectively. The stored parameter is a default value in an initial stage, but may be an updated value.

As illustrated in FIG. 8, the predictor information storage unit 43 stores required times $T_A$ to $T_H$, prediction accuracies $Q_A$ to $Q_H$, and computation operation counts $N_A$ to $N_H$ for the predictors A to H, respectively. Each of the required times $T_A$ to $T_H$ is a time required for each of the predictors A to H to perform predictive computation. Each of the prediction accuracies $Q_A$ to $Q_H$ is a value obtained by comparing a prediction result of each of the predictors A to H with an inspection result. Each of the prediction accuracies $Q_A$ to $Q_H$ may be a value obtained by comparing the prediction result with the result of the comprehensive main predictive computation described later. Each of the computation operation counts $N_A$ to $N_H$ is a count of operations of predictive computation. That is, each of the computation operation counts $N_A$ to $N_H$ corresponds to a count of operations of comparison between the prediction result and the inspection result (or the result of the comprehensive main predictive computation).

The weighting factor storage unit 44 stores weighting factors Ak, Bk, and Ck (illustrated in FIG. 12) to be used when a comprehensive main predictive computation unit 53 described later performs the comprehensive main predictive computation. The comprehensive main predictive computation yields a result by using results of the individual main predictive computation performed by the three operating predictors A, B, and C and changing weights of the operating predictors A, B, and C. That is, each of the weighting factors Ak, Bk, and Ck is a factor to be used for assigning a weight to each of the operating predictors A, B, and C at the time of comprehensive main predictive computation.

The prediction result storage unit 45 stores results of predictive computation performed by the predictors A to H. Further, the prediction result storage unit 45 stores a result of computation performed by the comprehensive main predictive computation unit 53 described later (result of the comprehensive main predictive computation). The inspection result storage unit 46 stores, for example, a result of inspection performed by an inspection apparatus different from the production apparatus 1 for the condition of the object W to be produced after the production is completed (after the processing is performed), or a result of inspection for the condition of the production apparatus 1 (for example, the condition of each component that constitutes the production apparatus 1).

The prediction accuracy storage unit 47 stores the prediction accuracies $Q_A$ to $Q_H$ of the predictors A to H. The prediction accuracies $Q_A$ to $Q_H$ are obtained by comparing the prediction results of the predictors A to H with the inspection result. The prediction accuracies $Q_A$ to $Q_H$ are also obtained by comparing the prediction results of the predictors A to H with the result of the comprehensive main predictive computation. In the latter case, the prediction results of the predictors A to H are evaluated under the assumption that the result of the comprehensive main predictive computation is correct.

The acquired data storage unit 48 stores detection data from each of the detectors 12b, 14c, 14d, 15b, 16, 17, and 18c of the production apparatus 1 (data on the production apparatus 1). Every time detection data is acquired, the acquired data storage unit 48 accumulates the new detection data in addition to the existing detection data.

The computation unit 50 includes a setting value initial computation unit 51, an individual main predictive computation unit 52, the comprehensive main predictive computation unit 53, a subsidiary predictive computation unit 54, a setting value update computation unit 55, and an interchanging processing unit 56.

Figure 9:
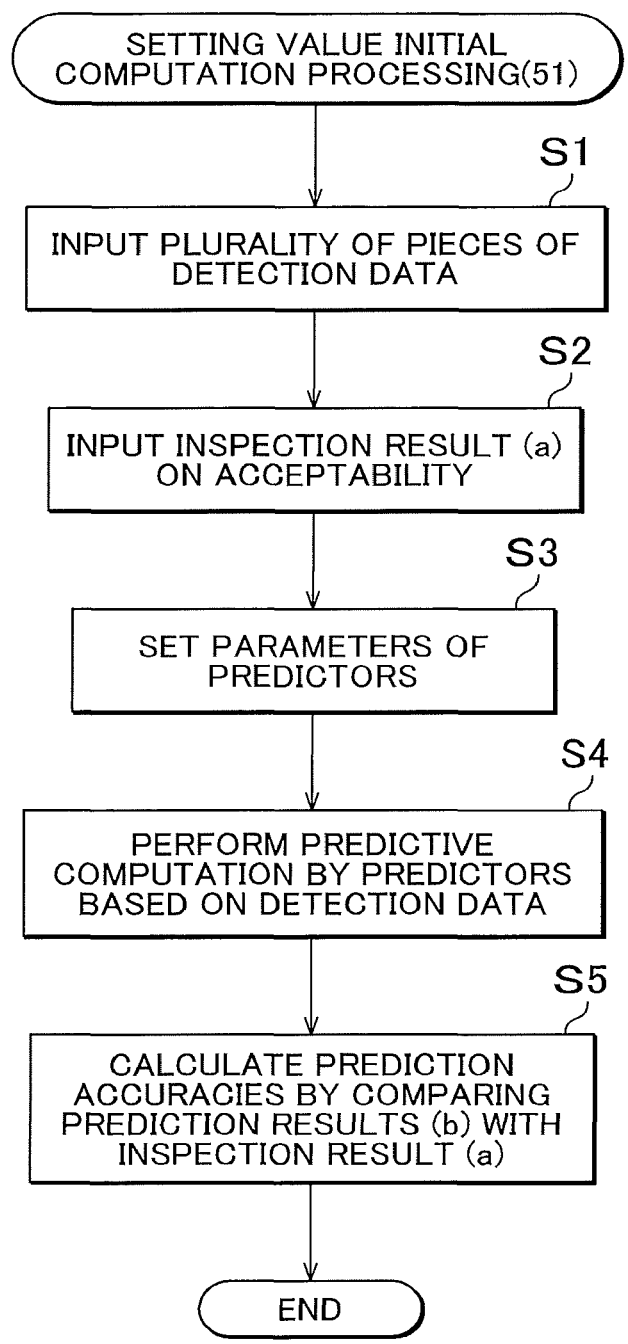
FIG. 9 is a flowchart illustrating setting value initial computation processing.

The setting value initial computation unit 51 sets initial parameters of the predictors A to H, and calculates the prediction accuracies $Q_A$ to $Q_H$ of the predictors A to H. As illustrated in FIG. 9, the setting value initial computation unit 51 inputs a plurality of pieces of detection data stored in the acquired data storage unit 48 (S1). Then, the setting value initial computation unit 51 inputs an inspection result (a) on the acceptability, which is stored in the inspection result storage unit 46 (S2). Then, the setting value initial computation unit 51 initially sets parameters of the predictors A to H by using the detection data and the inspection result (a) (S3). The initially set parameters of the predictors A to H are stored in the predictor parameter storage unit 42.

Then, the setting value initial computation unit 51 causes the predictors A to H to perform predictive computation based on the detection data (S4). The predictors A to H perform the predictive computation by using the initially set parameters. Prediction results of the predictors A to H are stored in the prediction result storage unit 45.

Then, the setting value initial computation unit 51 calculates the prediction accuracies $Q_A$ to $Q_H$ of the predictors A to H by comparing the prediction results (b) of the predictors A to H with the inspection result (a) (S5). The calculated prediction accuracies $Q_A$ to $Q_H$ are stored in the prediction accuracy storage unit 47.

An example of a method for calculating the prediction accuracies $Q_A$ to $Q_H$ is described with reference to FIG. 10. In the process of grinding crankshafts by a grinding machine, the prediction results (b) of the predictors A to H and the inspection result (a) are verified. A value obtained such that the number of crankshafts determined as non-defective items in both of the prediction results (b) and the inspection result (a) (pa1) is divided by the total number of crankshafts subjected to prediction and inspection (al1) is represented by p1 (=pa1/al1). A value obtained such that the number of crankshafts determined as defective items in both of the prediction results (b) and the inspection result (a) (pa2) is divided by the total number of crankshafts subjected to prediction and inspection (al1) is represented by p2 (=pa2/al1).

A value obtained such that the number of crankshafts determined as non-defective items in the prediction results (b) but as defective items in the inspection result (a) (pa3) is divided by the total number of crankshafts subjected to prediction and inspection (al1) is represented by p3 (=pa3/al1). A value obtained such that the number of crankshafts determined as defective items in the prediction results (b) but as non-defective items in the inspection result (a) (pa4) is divided by the total number of crankshafts subjected to prediction and inspection (al1) is represented by p4 (=pa4/al1). The setting value initial computation unit 51 calculates the values p1 to p4 for each of the predictors A to H. For example, the value p1 of the predictor A is represented by Ap1.

Next, the prediction accuracies $Q_A$ to $Q_H$ of the predictors A to H are calculated based on the values p1 to p4 of the predictors A to H. In this embodiment, each of the prediction accuracies $Q_A$ to $Q_H$ is a value obtained by subtracting a value that is twice as high as p3 and also subtracting p4 from the sum of the values obtained when the prediction results (b) and the inspection result (a) match each other (=p1+p2).

That is, the prediction accuracies are evaluated as being higher when the prediction results (b) and the inspection result (a) match each other, and as being lower when the prediction results (b) and the inspection result (a) do not match each other.

Each of the prediction accuracies $Q_A$ to $Q_H$ is calculated while changing the weights of the values p3 and p4 indicating prediction errors. That is, each of the prediction accuracies $Q_A$ to $Q_H$ is calculated so that the value p3 indicating that the crankshafts determined as defective items in the inspection result (a) are predicted as non-defective items has a greater influence than the value p4 indicating that the crankshafts determined as non-defective items in the inspection result (a) are predicted as defective items.

In the case corresponding to the value p3, that is, in the case where the crankshafts are determined as non-defective items in the prediction results (b) of the predictors A to H even though the crankshafts are defective items in actuality, the defective crankshafts are subjected to production processing to be performed after the grinding machine finishes the grinding. In this case, the subsequent processing is useless. That is, the loss of the production time is significant in the case corresponding to the value p3. Therefore, in this embodiment, the prediction accuracy is calculated by a calculation method in which the prediction accuracy decreases greatly in the case corresponding to the value p3.

In the case corresponding to the value p4, that is, in the case where the crankshafts are determined as defective items in the prediction results (b) of the predictors A to H even though the crankshafts are determined as non-defective items in the inspection result (a), the crankshafts are discarded after the grinding machine finishes the grinding. In this case, the loss of the production time is smaller than that in the case corresponding to the value p3. Therefore, the value p4 has a smaller influence on the prediction accuracy than the value p3. As described above, the degree of influence in the case of prediction errors is changed, thereby being capable of reducing the possibility that any defective object W to be produced is erroneously predicted as a non-defective item. As a result, the production cost can be reduced.

In this embodiment, p3 is doubled, but any value larger than 1 may be set as a value to be used for multiplication of p3 depending on the reliability of the object W to be produced. Use of a larger value for multiplication of p3 can increase the reliability of the prediction accuracy (reduce the possibility that any defective object to be produced is erroneously predicted as a non-defective item).

It is assumed that the prediction accuracies $Q_A$ to $Q_H$ of the predictors A to H are ranked in the order that is shown at the time T1 in FIG. 4. That is, the top three predictors A, B, and C are set as operating predictors, and the remaining predictors D, E, F, G, and H are set as subsidiary predictors.

Next, first computation processing to be performed by the computation unit 50 is described with reference to FIG. 5, FIG. 11, and FIG. 12. As illustrated in FIG. 5, the first computation processing is computation processing to be performed when the production apparatus 1 sequentially and continuously produces a plurality of objects W to be produced. The first computation processing to be performed by the computation unit 50 is processing implemented by the individual main predictive computation unit 52, the comprehensive main predictive computation unit 53, and the subsidiary predictive computation unit 54.

First, the individual main predictive computation unit 52 determines whether the production apparatus 1 starts its operation (S11), and causes the three operating predictors A, B, and C to perform the individual main predictive computation in real time based on the detection data acquired during the production process for the first object W to be produced (S12 to S14). As illustrated in FIG. 5, the three operating predictors A, B, and C perform the individual main predictive computation during the post-process for the first object W to be produced and the pre-process for the second object W to be produced. The three operating predictors A, B, and C may perform the operations of individual main predictive computation sequentially as illustrated in FIG. 5 or in parallel as illustrated in FIG. 11. The prediction results of the individual main predictive computation are stored in the prediction result storage unit 45.

Then, the comprehensive main predictive computation unit 53 performs the comprehensive main predictive computation in real time based on the prediction results of the three operating predictors A, B, and C (S15). An example of a method for the comprehensive main predictive computation is described with reference to FIG. 12.

The comprehensive main predictive computation unit 53 calculates prediction values Z1 to Z3 based on non-defective item probabilities Ar to Cr that are prediction results of the operating predictors A to C and the weighting factors Ak to Ck stored in the weighting factor storage unit 44. The weighting factors Ak to Ck are indices that are set based on the prediction accuracies $Q_A$ to $Q_C$ of the three operating predictors A to C. The prediction values Z1 to Z3 are values obtained such that values obtained by multiplying the non-defective item probabilities Ar to Cr by the corresponding weighting factors Ak to Ck are divided by the sum of the weighting factors Ak to Ck (Ak+Bk+Ck).

Next, the comprehensive main predictive computation unit 53 adds up the prediction values Z1 to Z3 of the operating predictors A to C. A value obtained by adding up the prediction values Z1 to Z3 is a result Z of the comprehensive main predictive computation (hereinafter referred to as "comprehensive prediction result") that is calculated by the analysis device 23. When the comprehensive prediction result Z satisfies a predetermined level, it is determined that the crankshaft is a non-defective item. When the comprehensive prediction result Z does not satisfy the predetermined level, it is determined that the crankshaft is a defective item. The prediction result of the comprehensive main predictive computation is stored in the prediction result storage unit 45.

Then, the individual main predictive computation unit 52 calculates the prediction accuracies $Q_A$ to $Q_C$ of the operating predictors A to C by comparing the prediction results (c) of the operating predictors A to C with the comprehensive prediction result (d) (S16). The prediction accuracies $Q_A$ to $Q_C$ are calculated by applying a method similar to the method illustrated in FIG. 10 to the operating predictors A to C. In this case, the inspection result in FIG. 10 is substituted by the result of the comprehensive main predictive computation. The calculated prediction accuracies $Q_A$ to $Q_C$ are stored in the prediction accuracy storage unit 47.

Then, the subsidiary predictive computation unit 54 determines whether the allowance time is present (S17). As illustrated in FIG. 5, the allowance time is a time in which the main predictive computation (including the individual main predictive computation and the comprehensive main predictive computation) is not performed in the post-process for the first object W to be produced and the pre-process for the second object W to be produced. When the allowance time is not present, the subsidiary predictive computation unit 54 does not perform any processing, and the first computation processing performed by the computation unit 50 is terminated.

When the allowance time is present, the subsidiary predictive computation unit 54 compares the required times of the subsidiary predictors D to H (see FIG. 8) with the allowance time. Then, the subsidiary predictive computation unit 54 determines whether subsidiary predictors having required times shorter than the allowance time are present among the subsidiary predictors D to H (S18) When such subsidiary predictors are not present, the first computation processing performed by the computation unit 50 is terminated.

When the subsidiary predictors that satisfy the condition are present, the subsidiary predictive computation unit 54 determines ranking for the subsidiary predictive computation by giving a higher priority to a subsidiary predictor having a higher prediction accuracy among the applicable subsidiary predictors (S19). In this embodiment, the subsidiary predictive computation unit 54 determines ranking randomly among a plurality of subsidiary predictors having higher prediction accuracies (S19). For example, when the subsidiary predictors that satisfy the condition of S18 are the subsidiary predictors D, E, F, G, and H, the top three subsidiary predictors having higher prediction accuracies are the subsidiary predictors F, G, and H. Therefore, the subsidiary predictive computation unit 54 determines a subsidiary predictor randomly from among the top three subsidiary predictors F, G, and H. The subsidiary predictive computation unit 54 may determine one or a plurality of subsidiary predictors depending on the length of the allowance time. FIG. 5 illustrates a case where the subsidiary predictor F is determined as a target.

Then, the subsidiary predictive computation unit 54 causes the determined subsidiary predictor (for example, the subsidiary predictor F) to perform the subsidiary predictive computation in real time during the allowance time (S20). The prediction result of the subsidiary predictive computation is stored in the prediction result storage unit 45. Then, the subsidiary predictive computation unit 54 calculates the prediction accuracy of the subsidiary predictor F by comparing the prediction result (e) of the subsidiary predictor F that performs the subsidiary predictive computation with the comprehensive prediction result (d) (S21). The prediction accuracy is calculated by applying a method similar to the method illustrated in FIG. 10 to the subsidiary predictor F. In this case, the inspection result in FIG. 10 is substituted by the comprehensive prediction result (d). The calculated prediction accuracy is stored in the prediction accuracy storage unit 47. Then, the first computation processing performed by the computation unit 50 is started from S11 again.

Next, second computation processing to be performed by the computation unit 50 is described with reference to FIG. 6 and FIG. 13. The second computation processing is processing to be performed when an operating time and a long non-operating time are set in the production apparatus 1 based on its production schedule. That is, the second computation processing to be performed by the computation unit 50 is intended for a longer time than that in the case of the first computation processing. The second computation processing to be performed by the computation unit 50 is processing implemented by the subsidiary predictive computation unit 54.

First, the subsidiary predictive computation unit 54 determines whether the production apparatus 1 starts its operation (S31), and acquires detection data while the production apparatus 1 is operating (S32). Then, the subsidiary predictive computation unit 54 determines whether the production apparatus 1 is not operating (S33). When the production apparatus 1 is still operating, the subsidiary predictive computation unit 54 repeats the processing from S31 again.

When the production apparatus 1 is not operating, the subsidiary predictive computation unit 54 compares the required times of the subsidiary predictors D to H (see FIG. 8) with the non-operating time. Then, the subsidiary predictive computation unit 54 determines whether subsidiary predictors having required times shorter than the non-operating time are present among the subsidiary predictors D to H (S34). When such subsidiary predictors are not present, the subsidiary predictive computation unit 54 repeats the processing from S31 again.

When the subsidiary predictors that satisfy the condition are present, the subsidiary predictive computation unit 54 determines ranking for the subsidiary predictive computation by giving a higher priority to a subsidiary predictor having a smaller computation operation count N among the applicable subsidiary predictors (S35). Then, the subsidiary predictive computation unit 54 causes the determined subsidiary predictor to perform the subsidiary predictive computation during the non-operating time (S36). The prediction result of the subsidiary predictive computation is stored in the prediction result storage unit 45.

Assume that, during a non-operating time from 12:00 to 13:00 in FIG. 6, the subsidiary predictors having required times shorter than the non-operating time are the subsidiary predictors F and H, for example. Of the subsidiary predictors F and H, the subsidiary predictor H is the subsidiary predictor having a smaller computation operation count N. Therefore, the subsidiary predictor H performs the subsidiary predictive computation during the non-operating time.

Assume that, during a non-operating time from 18:00 to 7:00 in FIG. 6, the subsidiary predictors having required times shorter than the non-operating time are the subsidiary predictors D, E, F, G, and H. Of the subsidiary predictors D, E, F, G, and H, the subsidiary predictors E, D, G, and H are ranked in this order from the smaller side in terms of the computation operation count N. Therefore, the subsidiary predictive computation is performed in the ascending order of the computation operation count N. The computation operation count of the subsidiary predictor F is large because the subsidiary predictive computation is performed many times in the first computation processing (see FIG. 5). Therefore, the subsidiary predictor F does not perform the subsidiary predictive computation during the non-operating time. The subsidiary predictor F may perform the subsidiary predictive computation during the non-operating time. The ranking for the subsidiary predictive computation during the non-operating time may be determined similarly to the ranking for the subsidiary predictive computation in the first computation processing to be performed by the computation unit 50.

Then, the subsidiary predictive computation unit 54 calculates the prediction accuracies $Q_H$, $Q_G$, $Q_D$, and $Q_E$ of the subsidiary predictors H, G, D, and E by comparing the prediction results (e) of the subsidiary predictors H, G, D, and E that perform the subsidiary predictive computation with the comprehensive prediction result (d) (S37). The prediction accuracies $Q_H$, $Q_G$, $Q_D$, and $Q_E$ are calculated by applying a method similar to the method illustrated in FIG. 10 to the subsidiary predictors H, G, D, and E. In this case, the inspection result in FIG. 10 is substituted by the comprehensive prediction result (d). The calculated prediction accuracies are stored in the prediction accuracy storage unit 47. Then, the second computation processing performed by the computation unit 50 is started from S31 again.

Processing to be performed by the setting value update computation unit 55 is described with reference to FIG. 6 and FIG. 14. The setting value update computation unit 55 determines whether the additional accumulation amount of the detection data reaches a value equal to or larger than a predetermined value (S41). When the additional accumulation amount does not reach the value equal to or larger than the predetermined value, the processing continues until the additional accumulation amount reaches the value equal to or larger than the predetermined value.

Then, the setting value update computation unit 55 determines whether the production apparatus 1 is not operating (S42), and inputs the existing detection data and the additional detection data (S43). The detection data is stored in the acquired data storage unit 48. Then, the setting value update computation unit 55 inputs a result of acceptability (S44). The result of acceptability means the inspection result (a) or the result of the comprehensive main predictive computation (d). Then, the setting value update computation unit 55 sets the parameters of the subsidiary predictors D to H again by using the detection data and the result of acceptability (a, d) (S45). The parameters of the subsidiary predictors D to H that are set again are stored in the predictor parameter storage unit 42.

Then, the setting value update computation unit 55 causes the subsidiary predictors D to H to perform predictive computation based on the detection data (S46). The subsidiary predictors D to H perform the predictive computation by using the parameters that are set again. Prediction results of the subsidiary predictors D to H are stored in the prediction result storage unit 45. Then, the setting value update computation unit 55 calculates the prediction accuracies $Q_D$ to $Q_H$ of the subsidiary predictors D to H by comparing the prediction results (e) of the subsidiary predictors D to H with the result of acceptability (a, d) (S47). The calculated prediction accuracies $Q_D$ to $Q_H$ are stored in the prediction accuracy storage unit 47.

The interchanging processing unit 56 interchanges the operating predictors and the non-operating predictors. The interchanging processing unit 56 performs interchanging processing when the main predictive computation is not performed. For example, the interchanging processing unit 56 may perform the interchanging processing in the allowance time during the operation illustrated in FIG. 5 or in the non-operating time illustrated in FIG. 6 (illustration is omitted from FIG. 6). The prediction accuracies $Q_D$ to $Q_H$ of the subsidiary predictors D to H are calculated as described above. As a result, as illustrated in FIG. 4, the prediction accuracy $Q_F$ of the subsidiary predictor F is higher than the prediction accuracy $Q_C$ of the operating predictor C at the time T2. In this case, the top three predictors having higher prediction accuracies are the predictors A, B, and F. Therefore, the interchanging processing unit 56 selects the predictors A, B, and F as operating predictors. At the time T3 and later in FIG. 4, the operating predictors A, B, and F perform the individual main predictive computation (S12 to S14 in FIG. 11).

In the description above, the interchanging processing unit 56 sets the top three predictors having higher prediction accuracies as operating predictors. The operating predictor and the subsidiary predictor may be interchanged when the prediction accuracy of a current subsidiary predictor is higher than the prediction accuracy of a current operating predictor by a predetermined value cc. Thus, frequent changes of operating predictors can be suppressed.

The interchanging processing unit 56 may perform the interchanging processing when the main predictive computation is performed during the operation. In this case, the types of the predictors are set identical to each other in order to suppress an abrupt change in the prediction accuracy when the predictors are interchanged. Thus, the change in the prediction accuracy can be suppressed.

As described above, the computation unit 50 that causes the operating predictors A to C to perform the main predictive computation also causes the subsidiary predictors D to H to perform the subsidiary predictive computation. Thus, the subsidiary predictors D to H can be evaluated with no need for a new dedicated apparatus. As a result, the reliabilities of the prediction accuracies $Q_D$ to $Q_H$ of the subsidiary predictors D to H are improved. Thus, even if the environment changes, the analysis method can be changed to an analysis method suitable for the changed environment.

The computation unit 50 causes the subsidiary predictors D to H to perform the subsidiary predictive computation when the operating predictors A to C do not perform the main predictive computation. Therefore, the subsidiary predictive computation does not influence the main predictive computation performed by the operating predictors. That is, the main predictive computation can be performed in real time while performing the subsidiary predictive computation.

Figure 11:
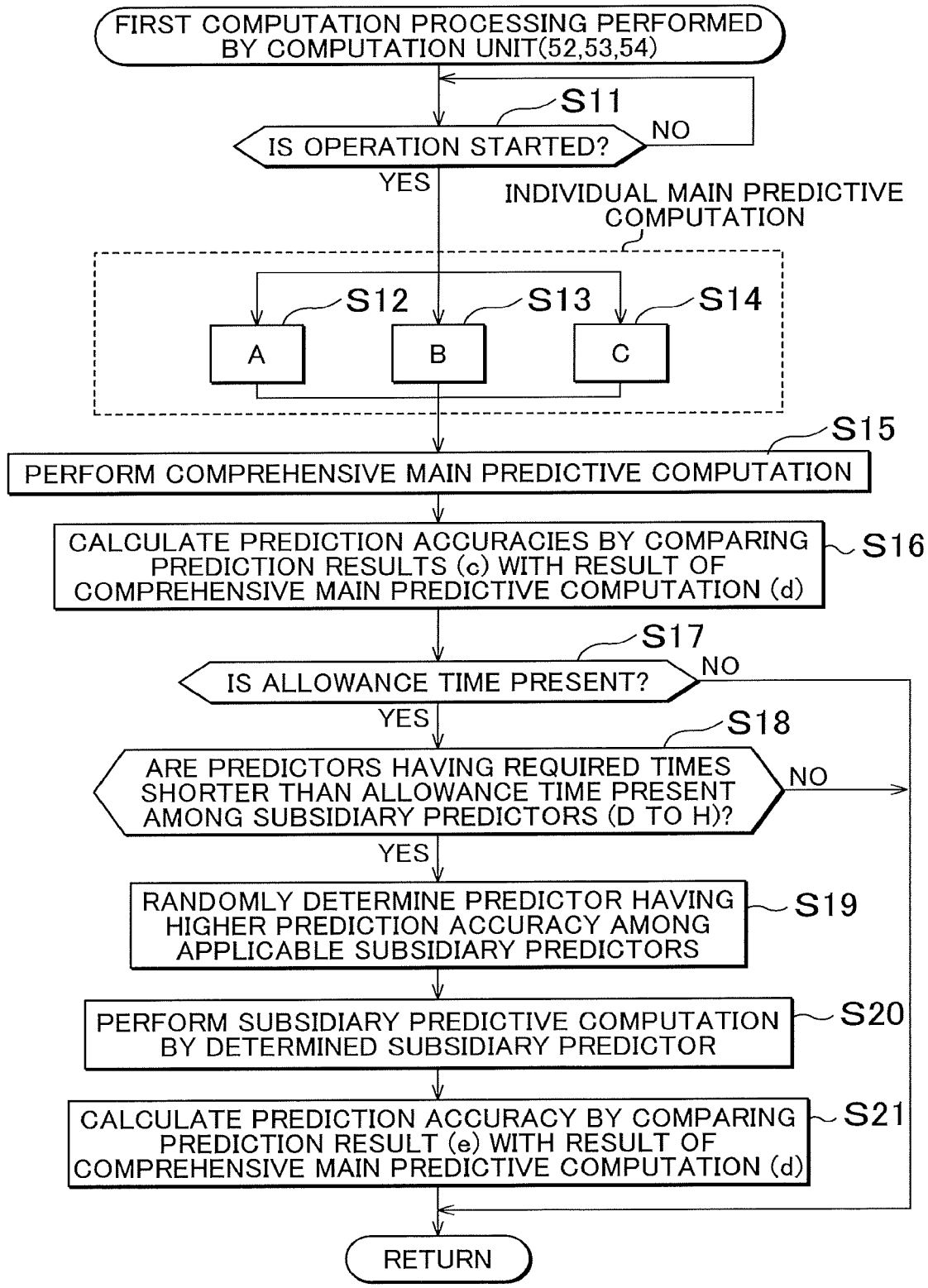
FIG. 11 is a flowchart illustrating first computation processing to be performed by the computation unit.

As illustrated in FIG. 5 and FIG. 11, the computation unit 50 acquires the detection data on the production apparatus 1 during the production process for the first object W to be produced, performs the main predictive computation during the post-process for the first object W to be produced and the pre-process for the second object W to be produced, and performs the subsidiary predictive computation in the allowance time in which the main predictive computation is not performed (continuous time in which the main predictive computation is not performed) during the same processes. Thus, the subsidiary predictors D to H can securely perform the subsidiary predictive computation many times.

In this case, based on the allowance time and the required times $T_D$ to $T_H$ of the plurality of subsidiary predictors D to H, the computation unit 50 performs the subsidiary predictive computation for the subsidiary predictors D to H having the required times $T_D$ to $T_H$ shorter than the allowance time. Thus, the allowance time can be used efficiently, whereby the subsidiary predictive computation can be performed many times.

Figure 13:
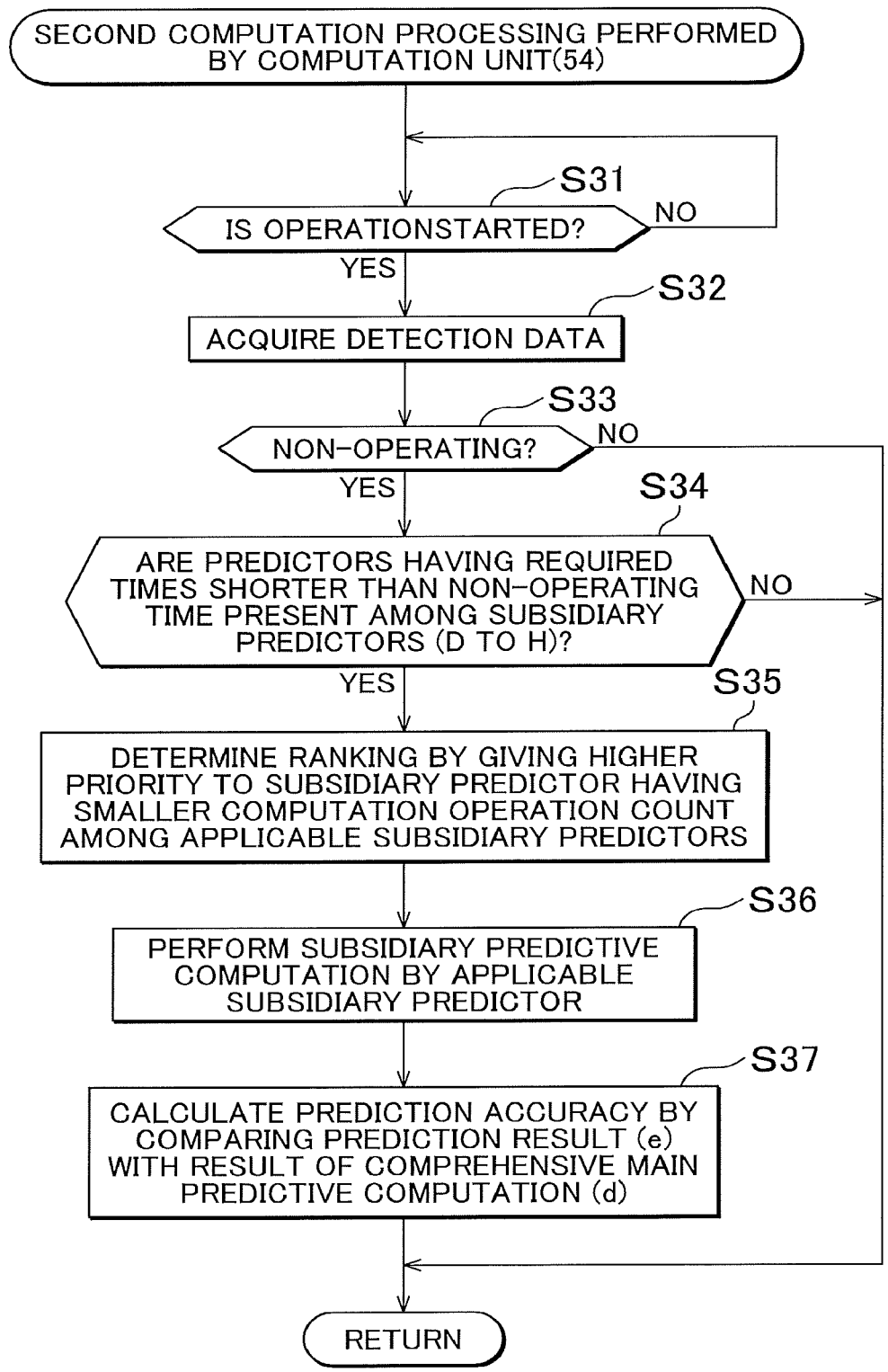
FIG. 13 is a flowchart illustrating second computation processing to be performed by the computation unit.

As illustrated in FIG. 6 and FIG. 13, the computation unit 50 performs the subsidiary predictive computation when the production apparatus 1 is not operating (in the continuous time in which the main predictive computation is not performed). By effectively using the long non-operating time, the subsidiary predictors D to H can securely perform the subsidiary predictive computation many times.

In this case, based on the non-operating time of the production apparatus 1 and the required times $T_D$ to $T_H$ of the plurality of subsidiary predictors D to H, the computation unit 50 performs the subsidiary predictive computation for the subsidiary predictors D to H having the required times $T_D$ to $T_H$ shorter than the non-operating time. Thus, the non-operating time can be used efficiently, whereby the subsidiary predictive computation can be performed many times.

As illustrated in FIG. 5 and FIG. 11, the computation unit 50 performs the subsidiary predictive computation for the plurality of subsidiary predictors D to H in the first computation processing while giving a higher priority to a predictor having a higher prediction accuracy among the prediction accuracies $Q_D$ to $Q_H$. Thus, the short allowance time can be used more efficiently.

As illustrated in FIG. 6 and FIG. 13, the computation unit 50 performs the subsidiary predictive computation for the plurality of subsidiary predictors D to H in the second computation processing while giving a higher priority to a predictor having a smaller predictive computation operation count among the predictive computation operation counts $N_D$ to $N_H$. Thus, the subsidiary predictor that cannot perform the subsidiary predictive computation in the short allowance time can securely perform the subsidiary predictive computation by using the long non-operating time.

Figure 14:
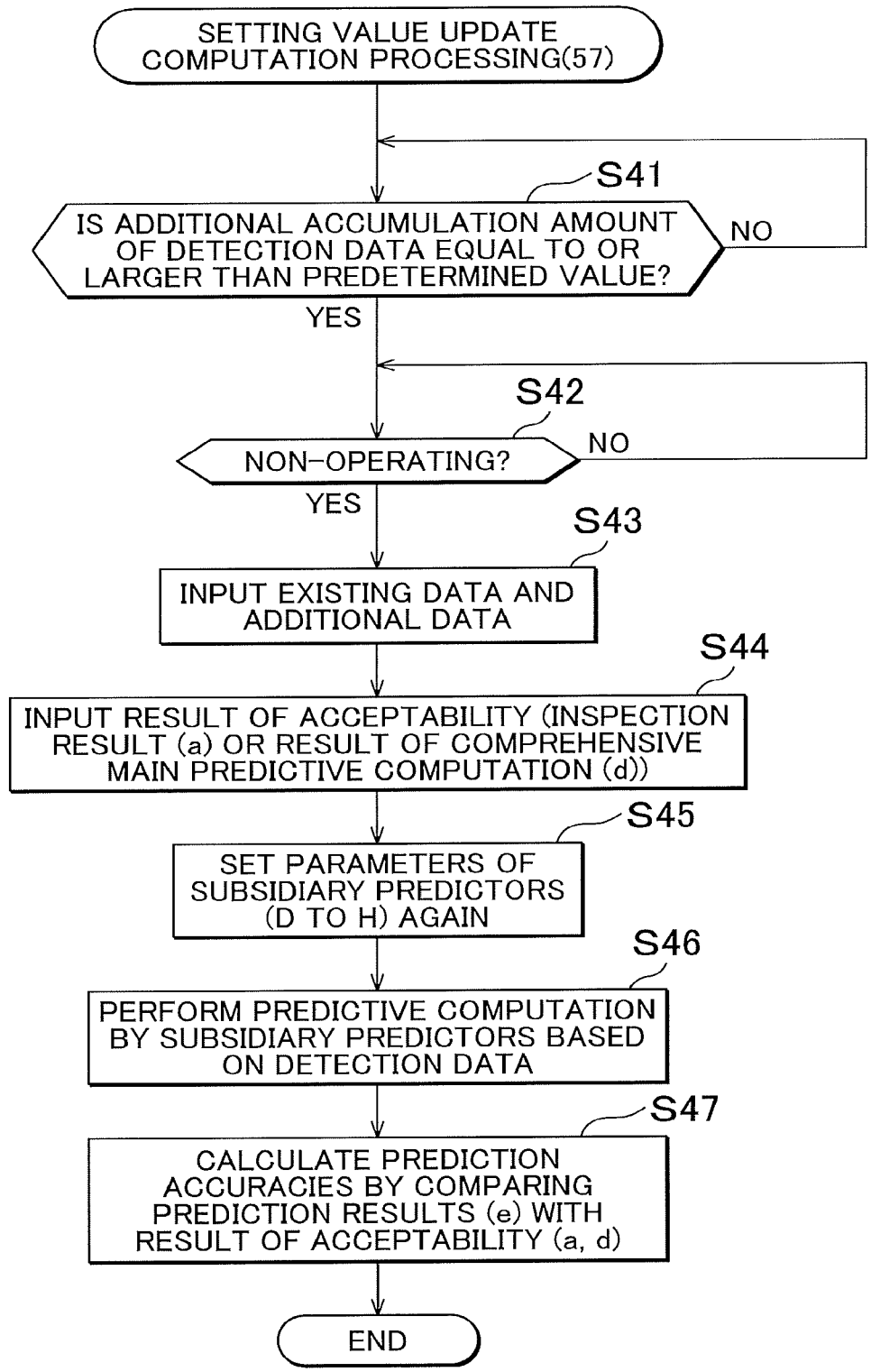
FIG. 14 is a flowchart illustrating setting value update computation processing.
Figure 15:
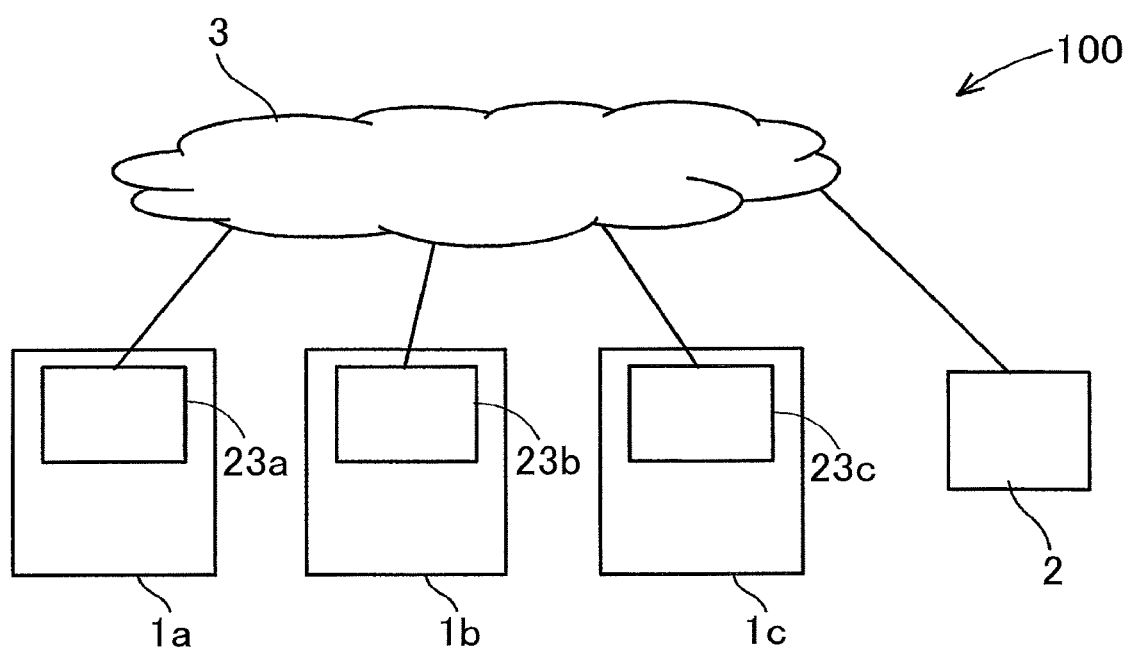
FIG. 15 is a diagram illustrating the configuration of an analysis system according to a second embodiment.

As illustrated in FIG. 6 and FIG. 14, the computation unit 50 sets the parameters of the subsidiary predictors D to H again based on the newly acquired detection data on the production apparatus 1 when the main predictive computation is not performed. Therefore, the subsidiary predictors D to H are further adapted to a current situation, whereby the prediction accuracies $Q_D$ to $Q_H$ of the subsidiary predictors D to H can further be improved.

The parameters of the predictors A to H are initially set by using the inspection result. By using the inspection result, the predictors A to H can be evaluated securely. However, the 100% inspection of the objects W to be produced may be skipped after the production apparatus 1 starts its operation. In this case, the inspection result cannot be acquired.

In this embodiment, the comprehensive main predictive computation is performed by using the plurality of operating predictors A to C. Therefore, the parameters of the subsidiary predictors D to H are set again by using the result of the comprehensive main predictive computation (comprehensive prediction result) in place of the inspection result. Thus, a large amount of information to be used for setting the parameters again can be acquired even if the 100% inspection of the objects W to be produced is not performed. As a result, the prediction accuracies $Q_D$ to $Q_H$ of the subsidiary predictors D to H are improved. In this case, the comprehensive prediction result needs to be a result that is highly accurate to some extent.

Similarly to the initial setting of the parameters, the initial values of the prediction accuracies $Q_A$ to $Q_H$ of the predictors A to H are set through the comparison with the inspection result. Through the comparison with the inspection result, the prediction accuracies $Q_A$ to $Q_H$ of the predictors A to H can be obtained securely. As described above, however, the 100% inspection of the objects W to be produced may be skipped after the production apparatus 1 starts its operation. In this case, the inspection result cannot be acquired.

In this embodiment, the prediction accuracies $Q_A$ to $Q_C$ of the operating predictors A to C and the prediction accuracies $Q_D$ to $Q_H$ of the subsidiary predictors D to H are calculated by using the comprehensive prediction result in place of the inspection result. Thus, the prediction accuracies $Q_A$ to $Q_H$ can be calculated even if the 100% inspection of the objects W to be produced is not performed. As a result, the reliabilities of the prediction accuracies $Q_A$ to $Q_H$ of the operating predictors A to C and the subsidiary predictors D to H are improved. Also in this case, the comprehensive prediction result needs to be a result that is highly accurate to some extent.

A second embodiment is described.

An analysis system using the analysis device 23 described above is described with reference to FIG. 15 and FIG. 16. An analysis system 100 includes a plurality of production apparatuses 1a, 1b, and 1c. Each of the production apparatuses 1a, 1b, and 1c corresponds to the production apparatus 1 of the first embodiment. The production apparatuses 1a, 1b, and 1c include first analysis devices 23a, 23b, and 23c, respectively. Each of the first analysis devices 23a, 23b, and 23c has a configuration similar to that of the analysis device 23 of the first embodiment.

The analysis system 100 includes a second analysis device 2. The second analysis device 2 and each of the first analysis devices 23a, 23b, and 23c are connected to each other via a network through a transmission line 3 so that data is communicable therebetween. The second analysis device 2 is an external computer, a server, or the like that is provided separately from the production apparatuses 1a, 1b, and 1c.

The analysis system 100 is configured to construct edge computing. The edge computing is a system that establishes network connection in a narrow area and is configured to process data in a place near a source of data. For example, the second analysis device 2 constructed by the edge computing may be a server (referred to as an edge server or the like) that has control over the production apparatuses 1a, 1b, and 1c.

The analysis system 100 is also configured to construct fog computing. The fog computing is a system that establishes network connection in a wider area than that of the edge computing. For example, the fog computing is installed in the same facility or in neighboring facilities (in a predetermined area).

The analysis system 100 may be configured to construct cloud computing that does not require its installation place. The cloud computing is a system that establishes network connection in a wider area than that of the fog computing.

That is, the data transmission speed of the network that constructs the fog computing is much higher than the data transmission speed of the network that constructs the cloud computing. Thus, in the network that constructs the fog computing, a large amount of data can be transmitted in a shorter time than that in the network that constructs the cloud computing. Further, the data transmission speed of the network that constructs the edge computing is even higher than the data transmission speed of the network that constructs the fog computing. Thus, in the network that constructs the edge computing, a large amount of data can be transmitted in a shorter time than that in the network that constructs the fog computing.

The number of connected production apparatuses 1a, 1b, and 1c is smaller in the edge computing, larger in the cloud computing, and medium in the fog computing between the edge computing and the cloud computing. Therefore, the edge computing is preferred when the processing is performed in real time, the cloud computing is preferred when many types of data are processed, and the fog computing is preferred when many types of data are processed while achieving real-time processing to some extent.

Figure 16:
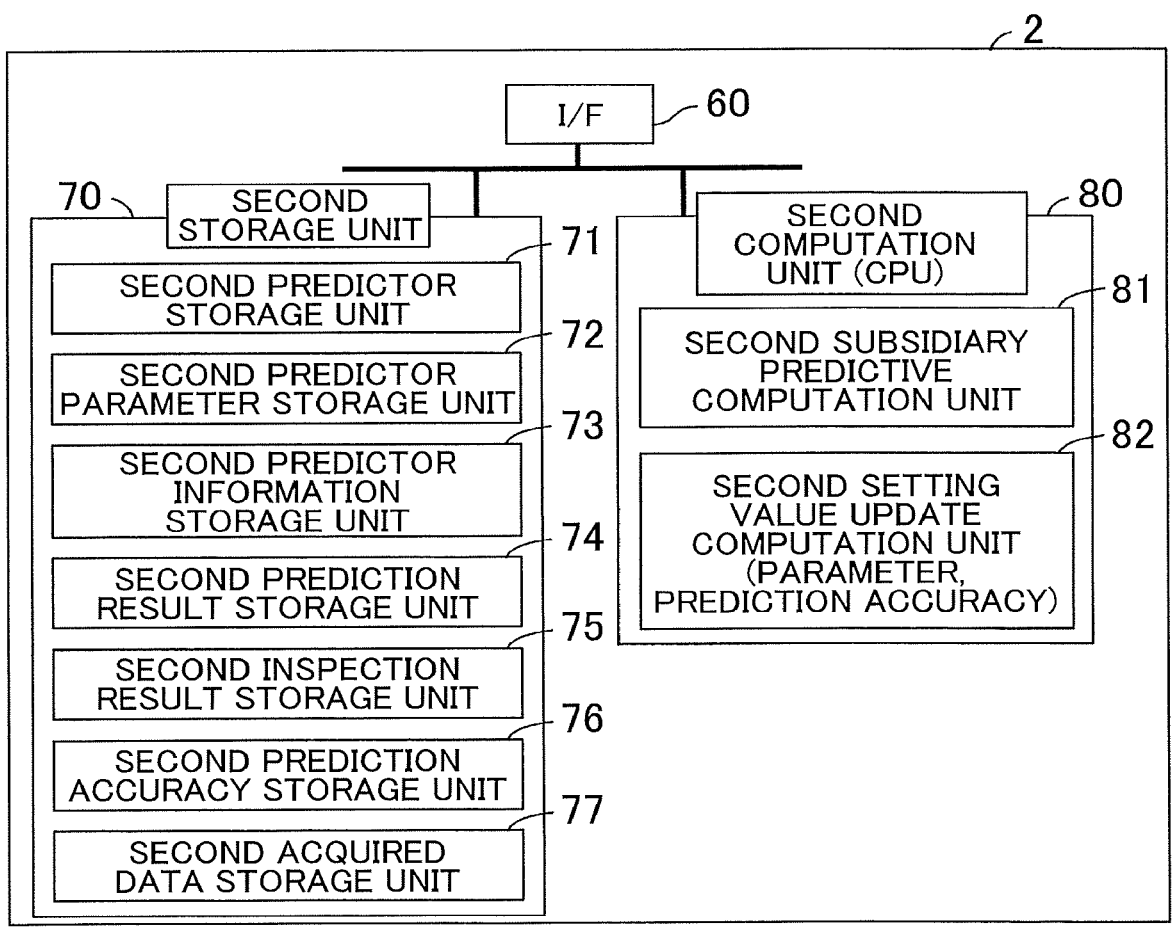
FIG. 16 is a block diagram illustrating the configuration of a second analysis device of the analysis system.

As illustrated in FIG. 16, the second analysis device 2 has a configuration similar to that of the first analysis device 23a (analysis device 23 of the first embodiment). The second analysis device 2 includes an interface 60, a second storage unit 70, and a second computation unit 80. The interface 60 is connected to the interface 30 (illustrated in FIG. 7) of each of the first analysis devices 23a, 23b, and 23c through the transmission line 3.

The second storage unit 70 includes a second predictor storage unit 71, a second predictor parameter storage unit 72, a second predictor information storage unit 73, a second prediction result storage unit 74, a second inspection result storage unit 75, a second prediction accuracy storage unit 76, and a second acquired data storage unit 77.

The second predictor storage unit 71, the second predictor parameter storage unit 72, the second predictor information storage unit 73, the second prediction result storage unit 74, the second inspection result storage unit 75, the second prediction accuracy storage unit 76, and the second acquired data storage unit 77 are substantially similar to the predictor storage unit 41, the predictor parameter storage unit 42, the predictor information storage unit 43, the prediction result storage unit 45, the inspection result storage unit 46, the prediction accuracy storage unit 47, and the acquired data storage unit 48 of each of the first analysis devices 23a, 23b, and 23c, respectively. The first analysis devices 23a, 23b, and 23c and the second analysis device 2 that correspond to each other share data therebetween. That is, when the data is changed in either of the first analysis devices 23a, 23b, and 23c or the second analysis device 2, the data is changed in the other as well.

The second acquired data storage unit 77 may store detection data that is exactly the same as that of the acquired data storage unit 48 of each of the first analysis devices 23a, 23b, and 23c. The detection data from each of the plurality of detectors 12b, 14c, 14d, 15b, 16, 17, and 18c is a considerable amount of data depending on the sampling time.

When the amount of detection data is large, the second acquired data storage unit 77 may acquire and store a part of the detection data stored in the acquired data storage unit 48 of each of the first analysis devices 23a, 23b, and 23c. For example, the detection data from the detector (vibration sensor) 12b configured to detect vibration of the main spindle is vibration data, and a part of the detection data that is acquired by the second acquired data storage unit 77 is a peak value in a predetermined frequency band of the vibration data. Thus, the amount of data in the transmission line 3 decreases greatly, whereby the second analysis device 2 can acquire the detection data earlier.

When the amount of detection data is large, the second analysis device 2 may acquire data obtained by compressing the detection data from each of the first analysis devices 23a, 23b, and 23c. In this case, the second analysis device 2 may acquire data obtained by compressing all or a part of the detection data. Thus, the amount of data in the transmission line 3 decreases greatly, whereby the second analysis device 2 can acquire the detection data earlier.

The second computation unit 80 of the second analysis device 2 is configured to perform processing independently of the computation unit 50 of each of the first analysis devices 23a, 23b, and 23c. That is, the second computation unit 80 is configured to perform processing in parallel with the computation processing performed by the computation unit 50 without influence on the processing speed of the computation unit 50. The second computation unit 80 includes a second subsidiary predictive computation unit 81 and a second setting value update computation unit 82. The second subsidiary predictive computation unit 81 and the second setting value update computation unit 82 are substantially similar to the subsidiary predictive computation unit 54 and the setting value update computation unit 55 of each of the first analysis devices 23a, 23b, and 23c, respectively.

That is, the second subsidiary predictive computation unit 81 performs second subsidiary predictive computation (corresponding to the subsidiary predictive computation performed by the subsidiary predictive computation unit 54) on the acceptability by using the subsidiary predictors D to H based on the information stored in the second storage unit 70. Prediction results of the second subsidiary predictive computation are stored in the second prediction result storage unit 74. Then, the second subsidiary predictive computation unit 81 calculates the prediction accuracies $Q_D$ to $Q_H$ of the subsidiary predictors D to H by comparing the prediction results of the subsidiary predictors D to H that perform the second subsidiary predictive computation with the comprehensive prediction result (prediction result obtained by the comprehensive main predictive computation unit 53 of each of the first analysis devices 23a, 23b, and 23c). The calculated prediction accuracies are stored in the second prediction accuracy storage unit 76.

The second setting value update computation unit 82 inputs existing detection data and additional detection data, and also inputs the result of acceptability. The result of acceptability means the inspection result or the result of the comprehensive main predictive computation. Then, the second setting value update computation unit 82 sets the parameters of the subsidiary predictors D to H again by using the detection data and the result of acceptability. The parameters of the subsidiary predictors D to H that are set again are stored in the second predictor parameter storage unit 72.

Then, the second setting value update computation unit 82 causes the subsidiary predictors D to H to perform predictive computation based on the detection data. The subsidiary predictors D to H perform the predictive computation by using the parameters that are set again. Prediction results of the subsidiary predictors D to H are stored in the second prediction result storage unit 74. Then, the second setting value update computation unit 82 calculates the prediction accuracies $Q_D$ to $Q_H$ of the subsidiary predictors D to H by comparing the prediction results of the subsidiary predictors D to H with the result of acceptability. The calculated prediction accuracies are stored in the second prediction accuracy storage unit 76.

According to this embodiment, the second computation unit 80 of the second analysis device 2 is configured to perform processing independently of the computation unit 50 of each of the first analysis devices 23a, 23b, and 23c, and performs the second subsidiary predictive computation on the acceptability by using the subsidiary predictors D to H. Thus, the second analysis device 2 can perform the second subsidiary predictive computation by using the subsidiary predictors D to H while the first analysis devices 23a, 23b, and 23c are performing the main predictive computation in real time. Thus, the reliabilities of the prediction accuracies $Q_D$ to $Q_H$ of the subsidiary predictors D to H can be improved securely.

The second storage unit 70 acquires and stores a part of the detection data on the production apparatus 1, which is acquired by each of the first analysis devices 23a, 23b, and 23c. The second computation unit 80 performs the second subsidiary predictive computation based on the part of the detection data. Therefore, the second computation unit 80 of the second analysis device 2 can perform processing in real time, and can also perform the second subsidiary predictive computation more frequently by using the subsidiary predictors D to H.

The second computation unit 80 sets the parameters of the subsidiary predictors D to H again based on the newly acquired detection data on the production apparatus 1. When the parameters are set again, a longer time is required as compared with the subsidiary predictive computation. Therefore, the second computation unit 80 of the second analysis device 2 sets the parameters again, and thus the parameters can appropriately be set again even earlier. As a result, the prediction accuracies $Q_D$ to $Q_H$ of the subsidiary predictors D to H are improved, and the operating predictors A to C are changed more appropriately.

Data on the prediction model of any one of the predictors A to H can be transmitted and received between the first analysis devices 23a, 23b, and 23c and the second analysis device 2. In this case, each of the first analysis devices 23a, 23b, and 23c and the second analysis device 2 can set the parameters or the like again. The operator can view the parameters or the like on the first analysis devices 23a, 23b, and 23c or the second analysis device 2. An external personal computer or the like can be connected to each of the first analysis devices 23a, 23b, and 23c, and the parameters and the data on the prediction models of the predictors A to H of each of the first analysis devices 23a, 23b, and 23c can be transmitted and received between each of the first analysis devices 23a, 23b, and 23c and the external personal computer or the like. In this case, the external personal computer can set the parameters or the like again. The operator can view the parameters or the like on the external personal computer.

In the embodiments described above, the comprehensive main predictive computation is performed by using the plurality of operating predictors A to C. Thus, the result can be obtained with a high prediction accuracy. A result of main predictive computation of a single operating predictor alone may be used directly as the result of acceptability. In this case, the single operating predictor is required to have a greatly high prediction accuracy.

What is claimed is:

1. An analysis device configured to predict an acceptability of a condition of a production apparatus or an acceptability of a condition of an object to be produced by the production apparatus, the analysis device comprising:
    a storage unit configured to store a plurality of predictors that are configured to predict the acceptability by using different analysis methods based on data on the production apparatus, the production apparatus configured to sequentially and continuously produce a plurality of the objects to be produced, and to perform, in one cycle, a pre-process, a production process, and a post-process for each of the objects to be produced;

a communication interface connected to the production apparatus, the communication interface configured to receive the data on the production apparatus from one or more detectors that detect operation of the production apparatus; and processing circuitry is configured to:
  acquire the data on the production apparatus during the production process for a first object to be produced,
  perform, based on the data on the production apparatus, main predictive computation on the acceptability in real time by using one or more operating predictors selected from among the plurality of predictors, the main predictive computation performed during the post-process for the first object to be produced and the pre-process for a second object to be produced that is subsequent to the first object to be produced,
  perform, in an allowance time after the main predictive computation is performed and during the post-process for the first object to be produced and the pre-process for the second object to be produced, subsidiary predictive computation on the acceptability by using one or more subsidiary predictors that are not selected from among the plurality of predictors, and
  perform, processing of interchanging the operating predictors and the subsidiary predictors based on prediction accuracies of the operating predictors and prediction accuracies of the subsidiary predictors.

2. The analysis device according to claim 1, wherein
the storage unit is configured to further store information on required times that are required for the plurality of predictors to perform predictive computation, and
the processing circuitry is configured to perform, based on the allowance time and the required times of a plurality of the subsidiary predictors, the subsidiary predictive computation for a subsidiary predictor having a required time shorter than the allowance time.

* * * * *